US006624605B1

(12) United States Patent
Powder et al.

(10) Patent No.: US 6,624,605 B1
(45) Date of Patent: Sep. 23, 2003

(54) METHOD, SYSTEM AND APPARATUS FOR OPENING DOORS

(75) Inventors: Joel Powder, Nesconset, NY (US); John Piechowiak, Franklin Sq, NY (US); James H. St. Pierre, Commack, NY (US); Peter Wolfe, Totowa, NJ (US); Donald Pastor, Northport, NY (US); Erick L. Dobis, Woodhaven, NY (US)

(73) Assignee: Telephonics Corporation, Farmingdale, NY (US)

( * ) Notice: Subject to any disclaimer, the term of this patent is extended or adjusted under 35 U.S.C. 154(b) by 0 days.

(21) Appl. No.: 09/875,799

(22) Filed: Jun. 6, 2001

(51) Int. Cl.[7] .......................... G05B 5/00; H02H 7/08; H02P 1/00; H02P 3/00; H02P 7/00

(52) U.S. Cl. ........................ 318/445; 318/466; 318/16; 318/51; 318/62

(58) Field of Search ................................ 318/445, 450, 318/453, 466, 468, 470, 364, 16, 51, 62, 53, 103, 111, 112, 113, 49, 266, 267, 272, 275, 277, 283, 286; 49/14, 24, 26, 25

(56) References Cited

U.S. PATENT DOCUMENTS

| | | | | | |
|---|---|---|---|---|---|
| 4,771,218 | A | * | 9/1988 | McGee | 318/16 |
| 4,808,995 | A | * | 2/1989 | Clark et al. | 49/25 |
| 5,285,136 | A | * | 2/1994 | Duhame | 318/266 |
| 5,872,513 | A | * | 2/1999 | Fitzgibbon et al. | 340/5.28 |
| 5,929,580 | A | * | 7/1999 | Mullet et al. | 318/466 |
| 5,950,364 | A | * | 9/1999 | Hormann | 49/26 |
| 6,181,095 | B1 | * | 1/2001 | Telmet | 318/266 |
| 6,326,754 | B1 | * | 12/2001 | Mullet et al. | 318/445 |
| 6,388,559 | B1 | * | 5/2002 | Cohen | 49/25 |
| RE37,784 | E | * | 7/2002 | Fitzgibbon et al. | 318/466 |

* cited by examiner

*Primary Examiner*—Robert E. Nappi
*Assistant Examiner*—Edgardo San Martin
(74) *Attorney, Agent, or Firm*—Bodner & O'Rourke; Thomas A. O'Rourke

(57) ABSTRACT

An improved garage door opener is disclosed. The garage door opener has a motor drive unit for opening and closing a garage door. The motor drive unit has a microcontroller. Connected to the motor drive unit is a wall console that resides inside the garage. The wall console also has a microcontroller. The microcontroller of the motor drive unit is connected to the microcontroller of the wall console by means of a digital data bus.

25 Claims, 29 Drawing Sheets

GDO BUS DATA TRANSFER

DATA BIT ASSIGNMENTS

| | |
|---|---|
| BIT # | 76543210 |
| MOTION | 1010000X |
| TOD CLOCK | 1001100X |
| LIGHT | 1001010X |
| SOUND | 1001000X |
| LOCK | 1000110X |
| UP-DN | 1000100X |

BIT 0 = ADDRESS SWITCH
BIT 6 = ALWAYS 0
BIT 7 = ALWAYS 1

WALL MOUNT
OPERATIONAL
CONTROL

RF LINKED
OPERATIONAL
CONTROLLER

METHOD, SYSTEM AND APPARATUS FOR OPENING DOORS

FIELD OF THE INVENTION

The present invention is directed to improvements in the area of powered door opening systems, methods and apparatus. The present invention has particular application for opening and closing garage doors.

BACKGROUND OF THE INVENTION

Mechanized door openers have become very prevalent in homes and many commercial establishments. These devices are designed to open the door upon receipt of a signal from a keyboard, horn, pressure of tires or footsteps on a sensor etc. Garage doors are a major market for many of these devices. Garage door openers have become ubiquitous in many communities. There are a number of problems with garage door openers, however. One of the problems with garage door openers is the issue of security. Until recently, many garage door openers had a limited number of security codes and as a result, there was a risk that-someone other that the home owner could open the garage by using the same manufacturer's transmitter. In addition, the security code was typically permanently installed in the garage door opener and lost transmitters could give unauthorized persons access to the premises.

A second issue with respect to garage door openers is the issue of injury to persons and property in the closing of the doors. Government standards require that there be at least two method of determining whether there is an obstruction in the path of travel. One common approach is the use of a light beam that passes from one side of the opening to the other. If an object or person is present in the path of travel, the light beam is broken and the downward travel of the door is halted. Insofar as the second means of determining whether there is an obstruction present, there are a number of approaches on the market. On approach that has been used is to ascertain whether the speed of the closing door has changed. These methods measure the speed and compare it to a base figure obtained from previous unobstructed closings. If the closure is taking longer the opener concludes there is an obstruction and terminates closure. Other approaches are also currently available.

Garage door opener setup is another area that can create problems for the installer. Once the garage door opener is installed on the door then the door opener must be adjusted so that the door reaches the ground surface on closing thus eliminating any gaps to permit ingress of vermin, cold air, and debris. Similarly, adjustment is also necessary to make sure (1) that the garage door will reverse its direction upon contact with a person or an obstruction; and (2) that the garage door is not damaged on closing because it is hitting the ground. Also needed to be adjusted after installation is the force of closure. Too great a closing force can injure a person or damage the door upon closing.

OBJECTS OF THE INVENTION

It is an object of the present invention to provide a system for opening and closing doors particularly garage doors.

It is an object of the invention to provide a garage door opener that has two upward speeds of travel, a first or initial lifting speed to provide quick opening of the door and a second slower speed to prevent damage to the door and or the opener as the door is raised.

It is another object of the invention to provide a garage door opener that has two downward speeds of travel, a first or initial speed to provide quick movement of the door to overcome inertia, and a second slower speed to provide a "soft stop" door closure.

It is an object of the present invention to provide improved security for communication between the motor control unit and a handheld RF operational control unit and/or the RF linked operational control unit that is mounted on a structure.

It is an object of the present invention to provide a garage door opener with an indoor panel functioning both as a control unit and a diagnostic information unit.

It is another object of the invention to provide a garage door opener with an indoor control panel designed in a modular fashion to provide control for two or more garage door openers.

It is a further object of the invention to provide a garage door opener with a keyless entry panel that will control two or more individual openers even when the openers are placed in the vacation mode.

It is a still further object of the invention to provide a garage door opener with an indoor control panel that connects to "off the shelf" motion sensors that cause an opener's built in lights to illuminate when motion is sensed.

SUMMARY OF THE INVENTION

The present invention is directed to an improved garage door opener. More and more homes these days are provided with two or three garage doors. Garage door openers operate a single garage door. In applications where there is more than one garage door, the homeowner has to install multiple garage door openers and their respective control panels. With traditional garage door openers, each door opener had to have separate wiring extending from each garage door opener to their respective wall panel located in the garage. Running the wiring for this arrangement was time consuming and required running the wire from each opener to its respective control panel usually along one or more walls to the wall panel. In the present invention a second garage door opener can be wired directly to a first garage door opener and the second wall mounted control panel can be connected directly to the wall panel for the first garage door opener.

The garage door of the present invention is provided with a first microcontroller in the wall panel and a second micro controller in the drive unit. Each microcontroller has a digital bus and are connected by preferably three wires because of the volume of date that is transferred from microcontroller to microcontroller. A first wire is typically a return ground wire. The second wire is used for data transfer. The third wire is for a clock. In accordance with the present invention, there may be multiple up to a total of 256 motor control units, i.e., openers, or wall units that may be connected together. This permits the homeowner to locate the wall units at more than one location in the garage for additional convenience.

The garage door opener of the present invention also permits the door speed to vary during operation. One of the issues with many current garage door openers is the amount of time it takes the door to open and close. The present invention permits the door to open and close rapidly until a preselected distance from the end of travel is reached. For example, the garage door of the present invention operates downwardly at a higher rate of travel until a selected point is reached. At that point, the control logic signals the motor to slow the door so that the door does not impact the floor of the garage with a great force thereby risking damage to the door. Similarly, when the door is rising, the door initially travels at a higher rate of speed until a preselected distance from the end of door travel is reached. When that preselected distance is reached the control logic signals the motor to slow the door so that the door does not damage the garage door opener. For downward travel the preselected point for slowing the door can be any distance from the floor, however, a distance of about 18" has been found satisfactory. For the travel of the door when it is opening, any distance may be selected. Usually about 12" from the termination point has been satisfactory. The microcontroller of the present invention controls the motor speeds and constantly calculates where the door is and compares it to a figure in memory. When the appropriate location is reached, the microcontroller signals the motor to slow down by changing one of the output pins on the microcontroller.

The drive unit of the garage door opener of the present invention is provided with an optical sensor mounted on a gear wheel that is caused to rotate by the belt. The microcontroller counts the revolutions of the wheel as it is turned by the belt and knows where the door is. This permits the microcontroller to learn when to stop the door and when to slow it down if there is a problem with the speed of the door, i.e., if there is binding of the door in the tracks, an obstruction present, a drop in the line voltage or if there is a mechanical problem such as a broken spring, wheel, etc.

The garage door opener of the present invention may also have an improved locking mechanism. The microcontroller controls an output pin that locks the drive gear connected to the motor. The locking mechanism has to be disengaged prior to each start of the motor and engaged after the motor ceases. The locking and/or unlocking of the opener before each action of the motor prevents the motor from operating while the opener is in a locked position. The method of the present invention controls the timing when the motor operates and when the lock is locked or unlocked. The method of the present invention also determines when the lock is to be engaged or disengaged and also tells the motor when the door has reached the end of travel and shuts the motor off. In a preferred embodiment, the present invention starts up the motor a short time after the lock disengages. The amount of time from the release of the lock and the engagement of the motor can vary but is usually in the vicinity of about 200 milliseconds after the disengagement of the lock. when the door is on the way down, the solenoid of the locking mechanism stays open until it reaches the full bottom limit or reaches an obstruction. if the door does not reach the fully down position due to, for example, a binding or an obstruction power to the solenoid causes the brake to be released. If the light beam is impeded the microcontroller will cause the door to cease its downward travel and reverse its direction of travel. Power to the solenoid will remain on until the door reaches its fully opened position.

In another embodiment of the present invention the outdoor keypad of the opener may be provided with a switch to turn on or off the light in the opener in the garage.

In a still further embodiment of the invention the door speed changes are measured based on a formula taking into consideration the time and speed and a number is calculated which creates a tolerance window. The force adjustment range is based on the number so calculated. This calculation is made approximately 16 times per second during operation and compared to the tolerance window but can be adjusted so that the calculation is made at other intervals greater than or less than 16 times per second. The tolerance window that is created is updated about 16 times per second. If there are problems with, for example, the line voltage, then the force calculation range shifts as the door operates. If there is an obstruction, the number will be outside the tolerance window and the opener will cease movement of the door.

In another embodiment, there may be an outdoor keypad usually placed on the outside wall of the garage or other structure. This outdoor keypad is able to control two doors. There is a user password that preferably has eight digits instead of the usual four digits. Typically, there are three different passwords, a primary, a secondary and an override. The primary password enables a person to change the settings on the keypad. The override password is used to override the vacation lock.

DETAILED DESCRIPTION OF THE INVENTION

Figure 1:
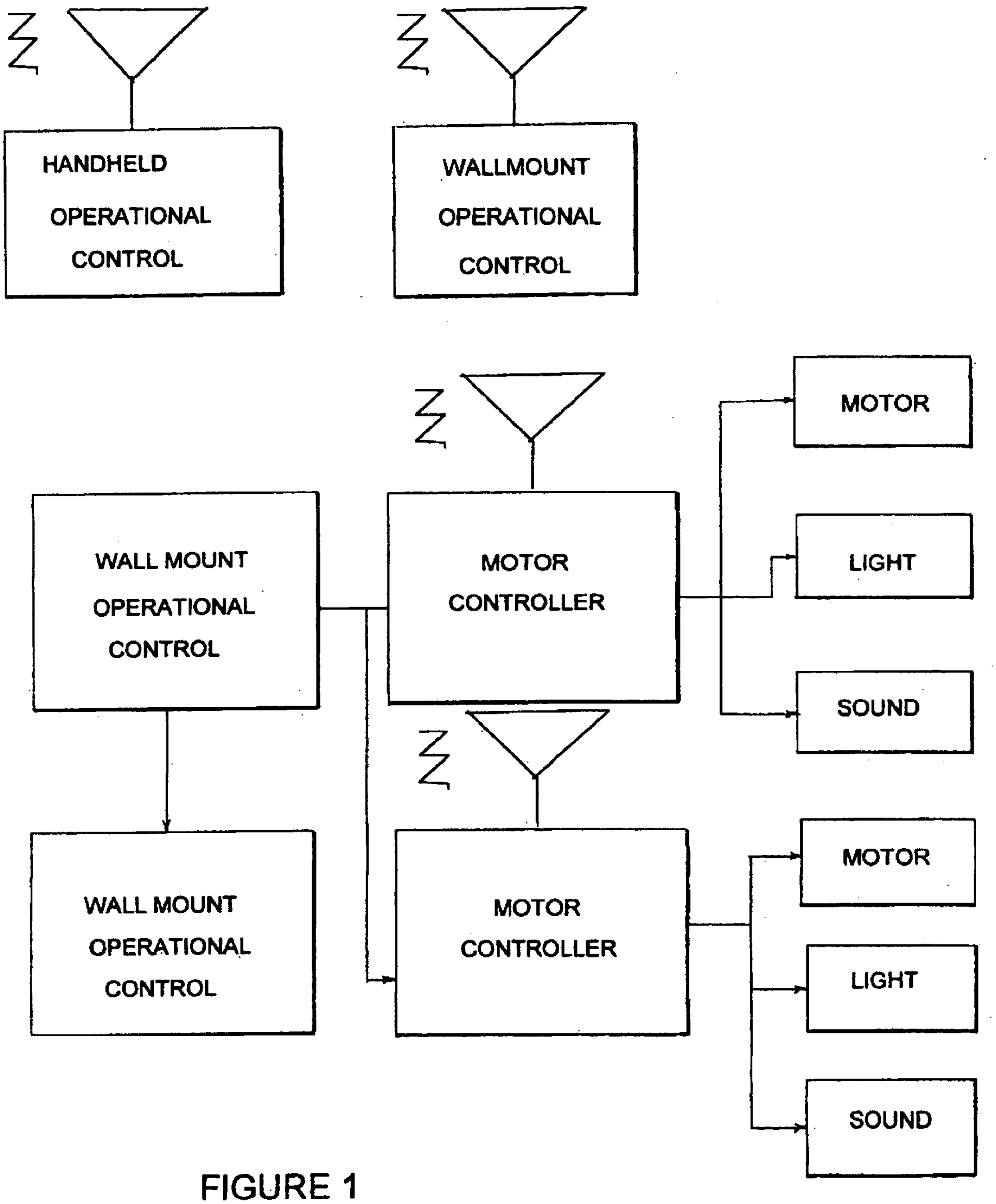
FIG. 1 is an example of a door system used to operate a door in accordance with the present invention.

The present invention relates primarily to overhead doors i.e., doors that are raised to open them as opposed to doors that swing open and shut. Doors that have particular applicability for the present invention are garage doors that ride on a track. The preferred doors of the present invention are typically provided with a plurality of rollers that are attached on either side of a door. The rollers ride in tracks that guide the door as it is opened and closed. These tracks are attached to the frame of the structure. The doors are raised and lowered by a mechanical garage door opener. An example of an apparatus for opening and closing a garage door is shown in co-pending U.S. patent application Ser. No. 09/875,794 and U.S. Design patent application Ser. No. 29/143,216 filed concurrently herewith the disclosures of which are incorporated herein by reference. It will be appreciated by those skilled in the art that the present invention can be used with other types of garage door openers or with other mechanisms for opening an overhead door, such as a security door and others.

The operation of the garage door of the present invention is described with respect to the preferred embodiment as follows:

The garage door opener of the present invention has a motor control unit that operates the motor for raising or lowering tile door. The motor control unit has a microcontroller, preferably a "PIC" microcontroller, one or more control switches and a photo detector. The photo detector may detect breaks in a beam of any type of light including visible, infrared, etc. The motor control unit may also be provided with a motor speed sensor, a light device, and/or a sound device. The motor control unit receives control data and initiates a corresponding motor, light and/sound action.

One of the sources of data for the motor control unit is the operational control unit or wall console. This unit is typically mounted on a wall of the structure that has a door to be opened. This wall unit is preferably hardwired to the motor control unit. The wall unit has a microcontroller, preferably a "PIC" microcontroller, one or more panel switches, one or more indicator means and a connection for a motion detector.

Another source of data for the motor control unit is the wireless keypad. The keypad has a microcontroller, preferably a "PIC" microcontroller. The keypad may also have keypad switches and a panel light.

Control Panel and Program Set Up

Upon first power-up of the garage door opener system it will be non-initialized and in the Manual/Learn mode. Non-initialized is the condition where the opener has no stored travel or force values. The lights will flash and remain on for 5 minutes and the audible alarm will sound. In addition, the Wall Unit "SAFETY" LED will momentarily flash ON and then turn OFF. All adjustments are performed using the three program buttons located on the head unit.

Initializing Door Travel

Before the door travel can be adjusted, it is necessary to move the belt trolley to a position so that the door arm can be attached to the door. The trolley can be moved manually by depressing either the "+" or "−" buttons on the head unit. The "+" button moves the door towards the closed (down) position and the "−" button moves the door towards the open (home) position. Either button must be held down for ½ second for the system to react.

The door may continue moving until the buttons are released. If the door encounters a binding or obstruction condition, which stops its travel, the system will turn off power to the motor. This condition must be corrected before the door can be manually moved again.

Once the door arm is attached to the door in its maximum closed position activate the system by depressing the "UP/DOWN" button on the Wall Unit. The door will start in the up direction until the "Home" Switch is reached. The Wall Unit "UP/DOWN" switch is the method of activating the door when the opener is in a non-initialized state. Once the door stops, double check its travel by again activating the Wall Unit "UP/DOWN" switch. The door should return to its initial down starting position. Holding down either the "+" or "−" button will no longer move the door. When depressing the "+ or −" buttons the door travel will be changed by 3/16 inch for each depression of the button, and this change Will take place on the next door movement cycle.

The opener has now learned its travel. If travel or force adjustments must be made, please refer to our next section.

The system may be reset into its original Non-Initialized state by:

Re-Initializing Door Travel

Momentarily remove power to the unit by pulling out the AC line cord, and then reinsert the line cord into the AC supply with the "PROG" button held depressed. The audible alarm will sound and then release the "PROG" button. When this is complete, the system is now reset and ready to repeat the initialization procedure.

Force Adjustments

All adjustments can be preformed from the three program buttons located on the unit.

Adjusting the Force

Force adjustments control the amount of power needed to open and close the door. The opener is designed to stop the door in the up direction if anything interferes with its travel. Likewise, the door will reverse and return to the home position if anything interferes when it is moving in the down direction. This includes binding or an unbalanced condition.

It should be noted that the force should not be set too light because this could lead to unnecessary stops or reversals.

In order to program the new garage door opener's open and close force limits it is necessary to enter program menu. The program menus settings are as follows. The audible alarm will sound with each step with each depression of the PROG button.

First Depression: Up Force adjustment

Second Depression: Down Force Adjustment

Third Depression: Car Remote Transmitter programming

Forth Depression: Exit program mode (alarm will sound twice)

Up Force Adjustment: Depress the PROG button once to enter this mode and then depress either the "+" or "−" buttons for adjustment. To complete the operation, depress the PROG three more times to store the value and exit the adjustment mode.

Down Force Adjustment: Depress the PROG button twice to enter this mode and then depress either the "+" or "−" buttons for adjustment. To complete the operation, depress the PROG two more times to store the value and exit the adjustment mode.

The opener should be run through a complete cycle, open/close after each adjustment.

Wall Unit

The Wall unit indicates difficulties during use of the garage door opener as well as controlling the opening and closing of the garage door.

LOW BATTERY: Illuminates when car remote's battery is low. Change Car Remote battery as soon as possible.

SAFETY FAULT: Illuminates when photo eye sensors have been tripped or there is a door jam.

LOCK: Illuminates when the system vacation lock is engaged

Programming Car Remote

The garage door opener is usually provided with two start-of-the-art Car Remote Transmitters. Each transmitter has the ability to operate up to three head units.

Depress the PROG button located on the head unit three times to enter this mode and then depress the "+" button to enter the LEARN mode.

Depress any Car Remote Transmitter button twice. Pause in-between presses. To complete the operation, depress the PROG button once.

Initiate door travel by depressing the button just programmed. Hold the button depressed until door begins to move. If door does not function, re-program the button carefully following the instructions above. If door still does not function, call the customer service line.

Operation of the Garage Door Opener

The garage door opener can be activated (operated) using the following accessories:

Wall Unit

Car Remote Transmitter

Wireless Keypad (Optional)

Motion Sensor (Optional—Only turns on lights)

Operating the Garage Door Opener via the Car Remote Transmitter

Depress the button that has been previously "programmed" and hold until door begins to move and then release button.

If necessary the garage door may be stopped and restarted via your "programmed" Car Remote Transmitter button.

Operating Your Garage Door Opener via the Wall Unit

Depress and hold the main motor control button on the Wall Unit until door begins to move.

Release the main motor control button. The opener may be stopped and restarted via this main motor control button.

Audible Alarm (System Enunciator)

The garage door opener may have an integrated safety enunciator, which will sound whenever the system encounters impedance to door movement.

Depress the enunciator button on the Wall Unit to stop the enunciator from sounding.

Vacation Lock Mode

The garage door opener may have the capability to be put in a vacation lock mode. When activated, the vacation lock mode disables the Wall Unit and Car Remote Transmitters from opening the door. The only means of opening the door is via the optional Wireless Keypad (when supplied), or by disabling the vacation lock using the VACATION LOCK button located on the Wall Unit.

To initiate vacation lock, depress the VACATION LOCK button located on the Wall Unit. The VACATION LOCK LED will illuminate when in use.

To disable the vacation lock, depress the VACATION LOCK until the VACATION LOCK LED is extinguished.

Light On/Off

The garage door opener preferably has an internal light fixture, which can be manually operated via the Wall Unit. Normally the lights will automatically illuminate whenever the opener is activated to either open or close the door. The lights stay on for 5 minutes. The LIGHT button, located on the Wall Unit will override the automated feature. Depressing the LIGHT ON/OFF button on Wall Unit will toggle the internal lights located on the head unit. When the lights have been manually turned on the automatic light timer is disabled. To turn the lights off, depress the LIGHT ON/OFF button AGAIN.

Optional Motion Sensor

The garage door interface with a motion sensor by plugging in the male telephone jack into the correct female socket located on the Wall Unit. The corresponding Wall Unit socket is marked via a motion sensor icon.

Wait 4 minutes. This allows the system to set itself. The motion sensor is now active; any movement in front of the sensor will turn on the lights in your head unit. The system resets after 5 minutes, but will stay on if movement is present.

I. Door Opener (GDO) System 1.0 Functional Requirements

The GDO system (FIG. 1) is preferably used to operate a garage doors with the following requirements:

The system may operate 1 or 2 or more doors independently of each other using either one indoor control panel or one outdoor keypad control panel or any one of a number of car remote control units.

The doors being control should operate at 2 speeds of travel.

At start up, approx. 10–17 inches per second and more preferably 13–15 inches per second.

After initial start up, @ approx. 5–8 and more preferably 6–7 inches per second.

The system should operate a light and a sound device for each door connected to the system.

The light device may be activated for each door movement and remain active for a minimum of about 4–5 minutes.

The sound device may be activated to indicate a failure with the door movement and preferably remain active until an operator interaction.

The system should monitor the door movement and prevent any door movement should the door encounter any obstruction or should a speed change indicate a door binding condition.

The system shall monitor the door run count vs. time and prevent excessive motor operation within a preset time period.

The Following specifications typically apply to the system of the present invention but are not limited thereto:

1. No door operation should take place without an operator action.
2. A setup procedure is normally needed after initial installation before proper door operation can be realized.
3. No Door Motor action should be taken at power up.
4. The Hardwired Operational Control Unit (OCU) should communicate with the Motor Control Unit (MCU) using a bi-directional serial bus.
5. Both the Handhold RF linked Operational Control unit and the RF linked Operational Control unit should incorporate a secure data transmission link to the Motor Control unit.
6. The system should provide for configuration of 2 Hardwired Operational Control Units (OCU) and 2 Motor Control Units (MCU).

II. Motor Control Unit (MCU) Operating Specifications 1.0 The Motor Control Unit may receive control data and initiate a corresponding motor, light or sound action.

2.0 Software Operating Requirements

Preferably, a "PIC" micro controller performs the interfacing and control functions between a preferred "HCS500" decoder device, an Indoor console panel and all the Sensors, Switches, Lights, Indicators and Motor relays needed for proper door operations. The HCS500 may contain all the necessary software needed to decode transmitted data received from any RF linked operational control device. The HCS500 should also contain a Serial # code and a Manufacture's ID code used for secure transmitter/receiver link operation.

3.0 The Following specifications preferably apply:

1. The "PIC" micro controller has internal non-volatile memory.
2. The "PIC" micro controller has No Sleep mode.
3. No operator interaction routine is needed for the "PIC" micro controller at power up.
4. A LIGHT device shall be incorporated in the Motor Control unit.
5. Linking each RF Operational Control unit to the Motor Controller shall require a "LEARN" procedure to be completed for each RF transmitter unit.
6. Pwr down shall not effect any Transmitter "LEARNED" code, Travel or Door Force setting data held in memory.
7. No Door Motor action shall be taken at power up.
8. All "LEARNED" codes shall be cleared from memory IF the "LEARN" button is held depressed during power up.

4.0 Preferred Hardware Configuration

1.) A "PIC" micro controller
2.) A set of control switches
3.) A Photo Detector.
4.) A motor speed sensor
5.) A light device
6.) A sound device 5.0 I/O configuration

TABLE 5.1

| Inputs (qty) | Purpose |
|---|---|
| 1. Travel Limit SW (1) | active LO signal indicating the door in the full back position. |
| 2. Program Button (1) | used to place Controller into program mode. |
| 3. Plus (+) Button (1) | used in conjunction with program button |
| 4. Minus (–) Button (1) | used in conjunction with program button |
| 5. Infrared Det (1) | Active LO signal indicating the presence of an obstruction in the path of the door. |
| 6. Speed Sensor (1) | pulses indicating the speed of the door motor. |
| 7. Address SW (2) | used to set Controller "Talk/Listen" serial data address. |

TABLE 5.2

| Outputs (qty) | Purpose |
|---|---|
| 1. Motor Relays (2) | signal controlling the direction and status a door motor. |
| 2. Speed Control (1) | signal controlling the motor speed |
| 3. Light Relay (1) | signal controlling the power to an incandescent light. |
| 4. Sound Relay (1) | signal controlling the power to a sound device. |
| 5 Brake Relay (1) | signal controlling the power to the belt brake device |
| 6 HCS500 Reset | signal controlling the HCS500 device reset |

TABLE 5.3

| Bi-directional (qty) | Purpose |
|---|---|
| 1. Serial Data (1) | Send/Receive serial data from the Indoor Console. |
| 2. Clock Signal (1) | Sync signal used in conjunction with Serial Data. |
| 3. Serial Data (1) | receive serial data from the HCS500 decoder. |
| 4. Clock Signal (1) | sync signal used in conjunction with Serial Data. |

6.0. Button Operation

Operator interaction is usually required to initialize the software program for proper operation.

6.1 Program Button

This button is used to toggle the software through the three operational adjustment modes.

Mode Function

1. Force up adjustment
2. Force down adjustment
3. Remote Transmitter Learn/Un-Learn command initiation 6.2 Plus (+) Button In mode 4 this button is used to adjust the door position forward. One depression preferably equals 0.196 inches of total door travel. (The travel per depression may be set to any amount desired.)

If the button is held depress for about 4 seconds, the door will start moving forward until the button is released.

In mode 1 and 2 (section 6.1), this button shall increment the corresponding adjustment. In mode 3 this button shall initiate the Learn command.

6.2 Minus (–) Button

In mode 4 this button is used to adjust the door position back. One depression preferably equals 0.196 inches of travel. (Other distances can be set if desired.)

If the button is held depress for about ½ second, the door will start moving back until the button is released.

In mode 1 and 2 (section 6.1), this button shall decrement the corresponding adjustment. In mode 3 this button shall initiate the Un-Learn command.

7.0 Belt Travel, Door Force and System Failures 7.1 Belt Travel 7.1.1 Full Belt travel speed shall be defined at X"/sec. Half Belt travel speed shall be defined at X"/sec.

7.1.2 Belt travel is be monitored preferably using a belt speed sensor at a rate of 16 times for 3.14" of belt travel (once every 0.196"). One (1) monitoring interval is defined as 1/16 of 3.14" belt travel.

A belt speed deviation factor of +2.5% & −2.5% has been incorporated in the speed checking routine. The deviation factor may vary as necessary.

7.1.3 From initial belt start to 1.07" of travel, an average speed value shall be calculated and shall be used to calculate an "out of speed" belt condition.

7.2 Door Force

The operator force adjustment factor for both forward belt travel and reverse belt travel preferably is in increments of 1% of belt speed travel.

7.2.1 The reverse belt travel adjustment factor is defined as the UP Force. The forward belt travel adjustment factor is defined as the Down Force.

7.2.2 Belt speed Tolerance is defined as the sum of belt speed deviation factor plus either the UP Force factor or the Down Force factor.

Tolerance=Speed Deviation+Force Factor

This Tolerance is calculated at motor start and is depended on the belt direction.

7.3 System Failure 7.3.1 Belt Speed Failures

An "in tolerance" condition is defined as belt travel which is within the Belt travel tolerance define in section 7.2.2 for one (1) monitoring interval. An "out of tolerance" condition is defined as belt travel which is not within the Belt travel tolerance define in section 7.2.2 for one (1) monitoring interval.

Belt start up is defined as the period FROM the time power is applied to the belt drive motor TO the time the belt has traveled 1.5 inch OR TO the time the speed monitoring sensor records one "in tolerance" condition which ever occurs first.

At belt start up time, up to eight (8) continuous "out of tolerance" conditions can be recorded before a door failure situation is triggered.

From the end of belt start up time to normal belt shut time only four (4) continuous "out of tolerance" conditions can be recorded before a belt failure situation is triggered.

7.3.2 Obstruction Failures

A signal from an IR detector shall be checked at every monitoring interval define in section 7.2.1. Should this signal indicate an obstruction condition an obstruction failure situation should be triggered.

8.0 Terminal Handshaking and Data Transfer 8.0 This section describes the method for terminal handshaking and data transfer among the terminals connected to the Garage Door Opener System.

A "terminal" shall be defined as any unit connected to the common data bus of the Garage Door Opener System. (FIG. 1.)

Figure 2:
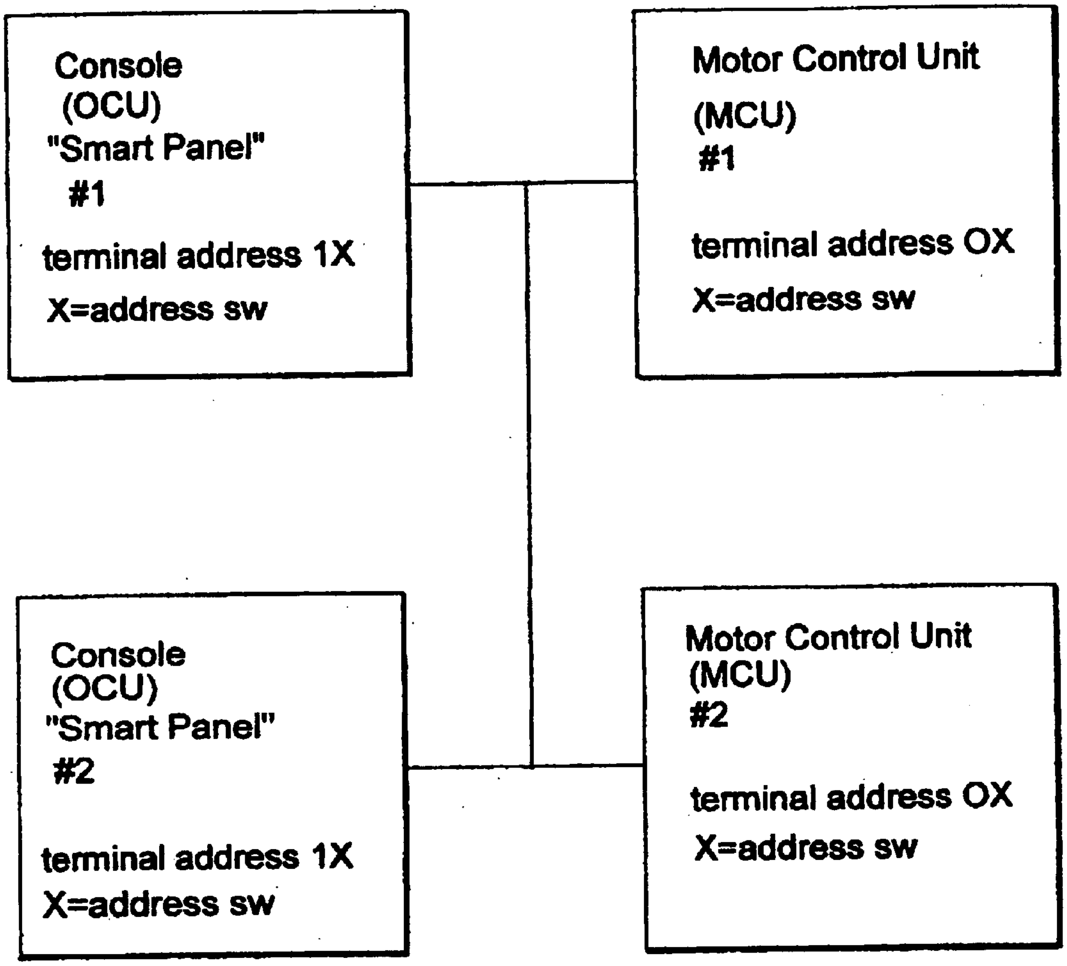
FIG. 2 shows the data bus used to carry data among the terminals connected on the bus.

A "common data bus' ("bus") shall consist of one wire to carry data ("data line") and one wire to carry a synchronous clock signal ("clock line") among the terminals connected on the bus. (See FIG. 2)

8.1 Standby 8.1 In a standby condition the data line should be at a low voltage level and the clock line should be at a high level.

Any terminal connected to the bus should force the data line to a low level using its internal circuitry.

Any terminal connected to the bus should allow the clock line to remain at a high impedance state using its internal circuitry. An external circuit shall keep the clock line at a high level.

8.2 Bus Request 8.2.1 If any terminal connected to the bus initiates a request to send data to any other terminal on the bus the terminal initiating the request should bring the clock line to a low level.

8.2.2 The terminal initiating the request should wait for the other terminals on the bus to acknowledge the request. The request is acknowledged by the other terminals bring there data line to a high impedance state. An external circuit should bring the data line to a high level if all the other terminals acknowledge by bring there data line to a high impedance state.

8.2.3 Once all the terminal acknowledgments are recognized, the terminal initiating the request shall proceed to transfer data to the terminals connected on the bus.

Figure 3:
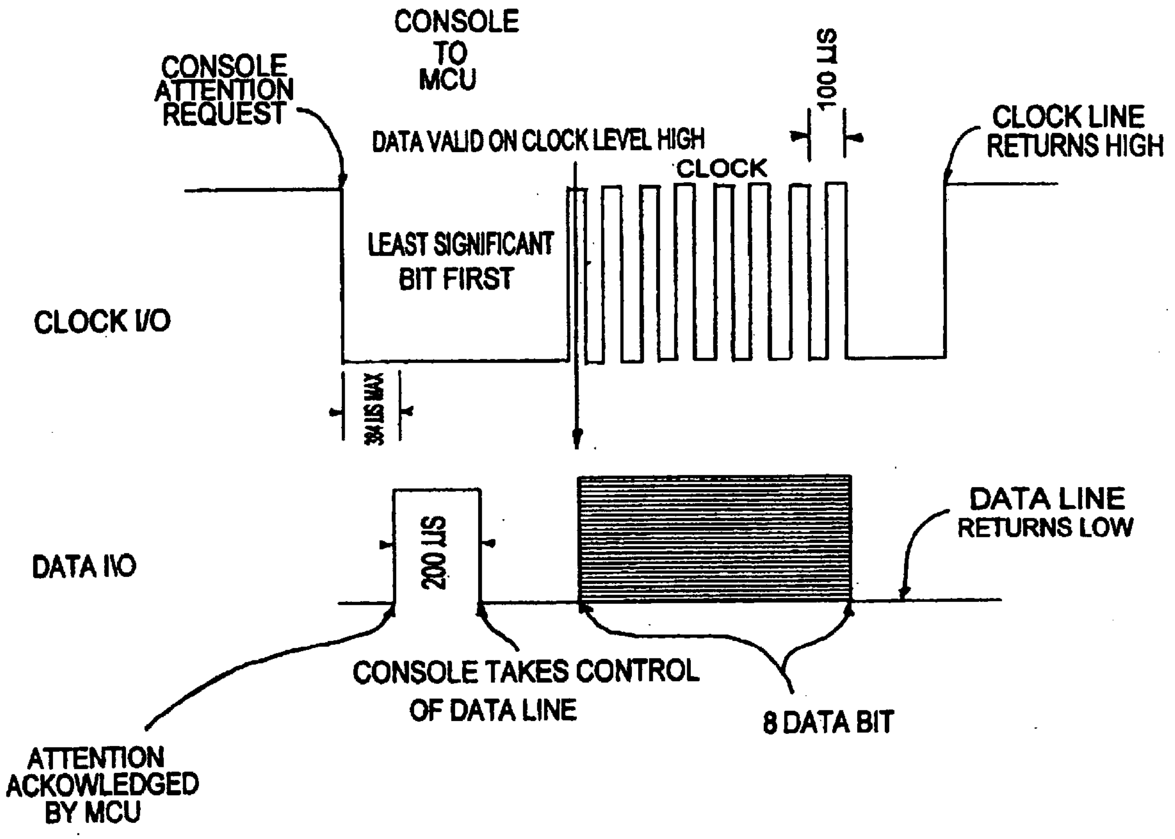
FIG. 3 shows the relationship between the terminal and the clock line.

8.3 Data Transfer 8.3.1 The terminal initiating the request should set the data line to the level that reflects the level of the first bit of data needed to be transferred. The terminal initiating the request should next set the clock line to a high level for 50 us which will signal all the other terminals that a valid data bit condition is present on the data line. The terminal initiating the request shall then bring the clock line back to a low level for 50 us. (FIG. 3)

8.3.2 Step 8.3.1 should be repeated until all data bit are transferred to all other terminals on the bus.

8.4. Serial Data Layout 8.4.1 Eight (8) data bits are preferably used in the terminal data transfer.

Two (2) data bits (bit 0,1) may be assigned for terminal addressing and Six (6) data bits (bits 2–7) may be assigned for data information.

8.4.2 A maximum of two (2) motor controller units (MCU) and two (2) operational control units (OCU) can be connected to the Garage Door Opener System bus in this embodiment.

8.4.3 Terminal addressing should be assigned as follows:

The motor controller units . . .

bit 1 shall always equal 0 bit 0 shall be either 0 or 1 (depending on the address switch position set on the MCU circuit card).

(Address=1x).

The operational control units . . .

bit 1 shall always equal 1 bit 0 shall be either 0 or 1 (depending on the address switch position set on the OCU circuit card).

(Address=0x).

TABLE 8.1

| Terminal | MCU 1 | MCU 2 | OCU 1 | OCU 2 |
|---|---|---|---|---|
| Address* (Bit 1,0) | 00 | 01 | 10 | 11 |

| Value(h) | Command |
|---|---|
| Received* Data Word Assignments (Bits 2–7) | |
| 1 | no assignment |
| 2 | on/off door action |
| 3 | toggle Lock function |
| 4 | sound off command |
| 5 | light on command |

TABLE 8.1-continued

| | |
|---|---|
| 6 | close door command |
| 7 | open door command |
| 8 | light on command |
| Send* Data Word Assignments (Bits 2–7) | |
| 1 | activate Safety led |
| 2 | unused |
| 4 | activate Photo |
| 8 | activate LoBattery |
| 10 | activate Lock |
| 12 | activate Sound Off |

(* w/ address sw set for 4 terminal operation)
(*note: MCU) See FIG__

9.0 MCU Software

The MCU software described in this section is preferably loaded into a microprocessor preferably a MicroChip #PIC16C57 device. This device has 2K(×12) bytes of user program memory.

9.1 Program Routines

| Main | Purpose |
|---|---|
| 1. Init | load/set all program operating parameters |
| 2. Main Loop | program flow control |
| 3. Motor | main motor control service routine |
| 4. Light | control light on/off timing |
| 5. Sound | control sound on/off timing |
| 6. Console Listen | used to take data from OCU |
| 7. Console Talk | used to send data to OCU |
| 8. Remote(HSC500) Listen | used to take data from HSC500 |
| 9. Remote(HSC500) Talk | used to send data to HSC500 |
| 10. Motor__On | turns motor on |
| 11. Motor__Off | turns motor off |
| 12. Spd__Delta | controls motor speed |
| 13. Reverse (travel) | belt directional control |
| 14. Button | takes data from operational buttons |
| 15. Tim/Overrun | controls motor operation vs. time |
| **SubRoutines** | **Purpose** |
| 1. Time delays | controls time delays within routines |
| 2. ComInit | prepares data for console |
| 3. RemInit | prepares data for HSC500 |
| 4. Process data | translates data rec'd from console or HSC500 |
| 5. Dev__force | calculates motor deviation spec |
| 6. Force__tol | adjust motor force tolerance |
| 7. New__Position | tracks belt position |
| 8. Ave__spd | calculates motor average speed |
| 9. Speed__ck | calculates motor speed |
| 10. Zero__ck | monitors zero door position |

Figure 4:
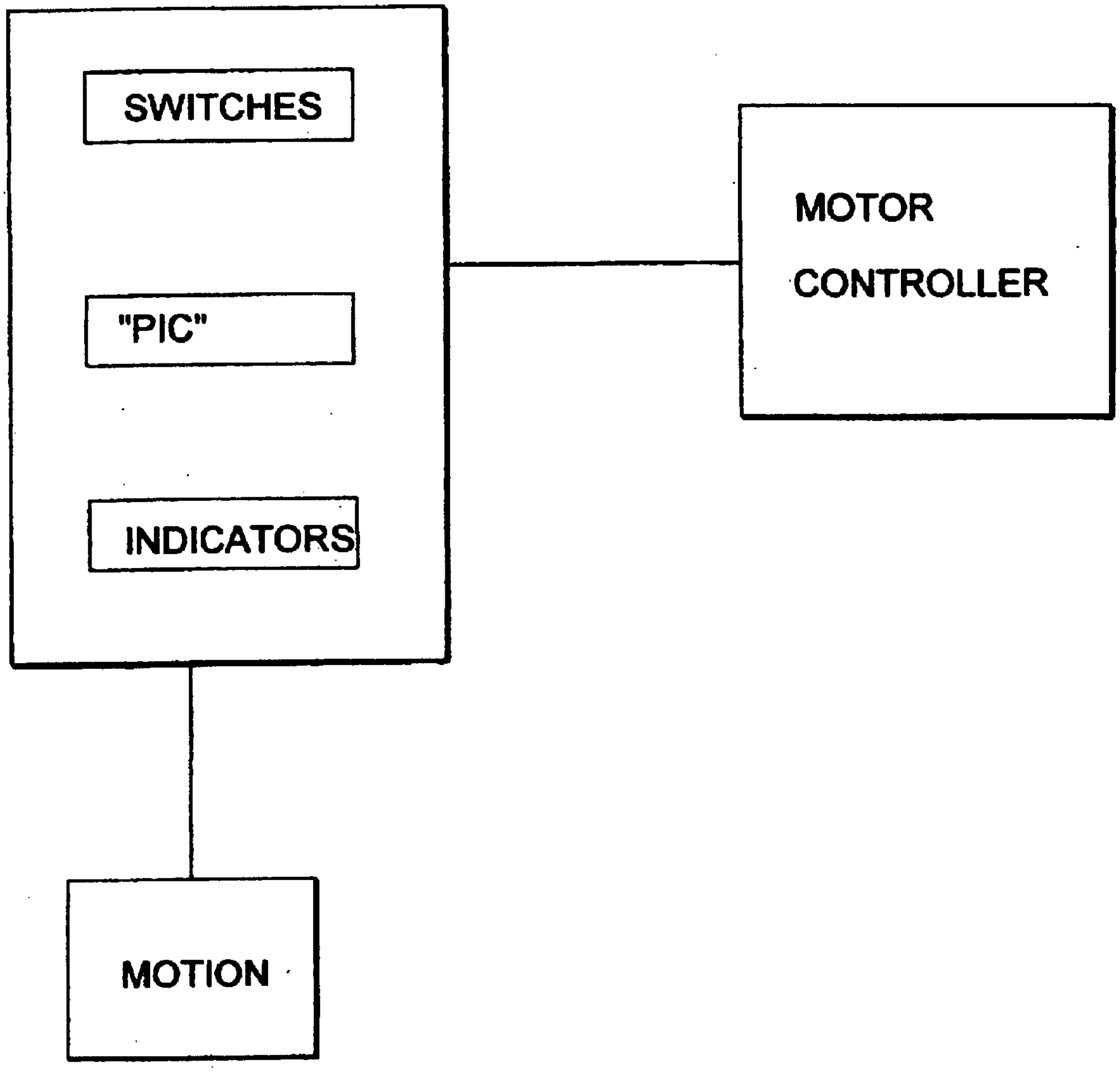
FIG. 4 shows the Hardwired Operational Control Unit

III Operational Control Unit, Wall Console (OCU) Specifications 1.0 The Hardwired Operational Control (FIG. 4) Unit should allow an operator to send commands to the Motor Control Units (MCU). The following specifications preferably apply for a single OCU. Should a double OCU unit replace the single unit then this specification may apply for each OCU section of the double OCU.

2.0 Software Operating Requirements

Preferably, a "PIC" micro controller shall perform the interfacing and control between the Motor Controller and the console panel switches, indicators and an optional motion detector.

3.0 The Following preferred specifications apply:

3.1 The console has no internal non-volatile memory.

3.2 The console has No Sleep mode.

3.3 No operator interaction routine is needed for the "PIC" console at initial power up.

4.0 Preferred Hardware Configuration

1.) A "PIC" micro controller

2.) Panel switches

3.) Indictor

4.) Motion detector 5.0. I/O Configuration

TABLE 5.1

| Inputs (qty) | Purpose |
|---|---|
| 1. Up/Down Button (1) | Used to signal a door movement. |
| 2. Lock Button (1) | Used to disable (lock) the Motor Controller. |
| 3. Sound Button (1) | Used to disable the sound device. |
| 4. Light Button (1) | Used to turn toggle door light. |
| 5. Motion Sig | Used to detect area motion. |
| 6. Address SW (1) | Used to set Console Talk/Listen serial data address. |

TABLE 5.2

| Outputs (qty) | Purpose |
|---|---|
| 1. Lock LED (1) | Used to indicate to Lock status. |
| 2. Fault LED (1) | Used to indicate to door operational fault. |
| 3. LO Bat LED (1) | Used to indicate to a LO battery condition. |

TABLE 5.3

| Bi-directional (qty) | Purpose |
|---|---|
| 1. Serial Data (1) | Send/Receive serial data from the Motor Controller. |
| 2. Clock Signal (1) | Sync signal used in conjunction with Serial Data. |

6.0. Button Operation 6.1 Up/Down Button

This button shall send a door operation command to the MCU. The operation command shall toggle the current door movement(stop/run).

6.2 Light Button

This button shall turn the MCU light on.

6.3 Lock Button

This button shall prevent any door action.

6.4 Sound Button

This button shall turn the MCU sound device off.

7.0 OCU Software

The preferred OCU software described in this section will be loaded into, for example, a MicroChip #PIC16C55 device. This device has 512(×12) bytes of user program memory.

7.1 Program Routines

| Main | | Purpose |
|---|---|---|
| 1. | Init | load/set all program operating parameters |
| 2. | Main Loop | program flow control |
| 3. | Listen | used to take data from MCU |
| 4. | Talk | used to send data to MCU |
| 5. | Display | used to translate rec'd data to LED |
| **SubRoutines** | | **Purpose** |
| 1. | Time delays | controls time delays within routines |
| 2. | Com Init | prepares data for console |

IV Remote Operational Control Unit, Keypad (ROCU)

Figure 5:
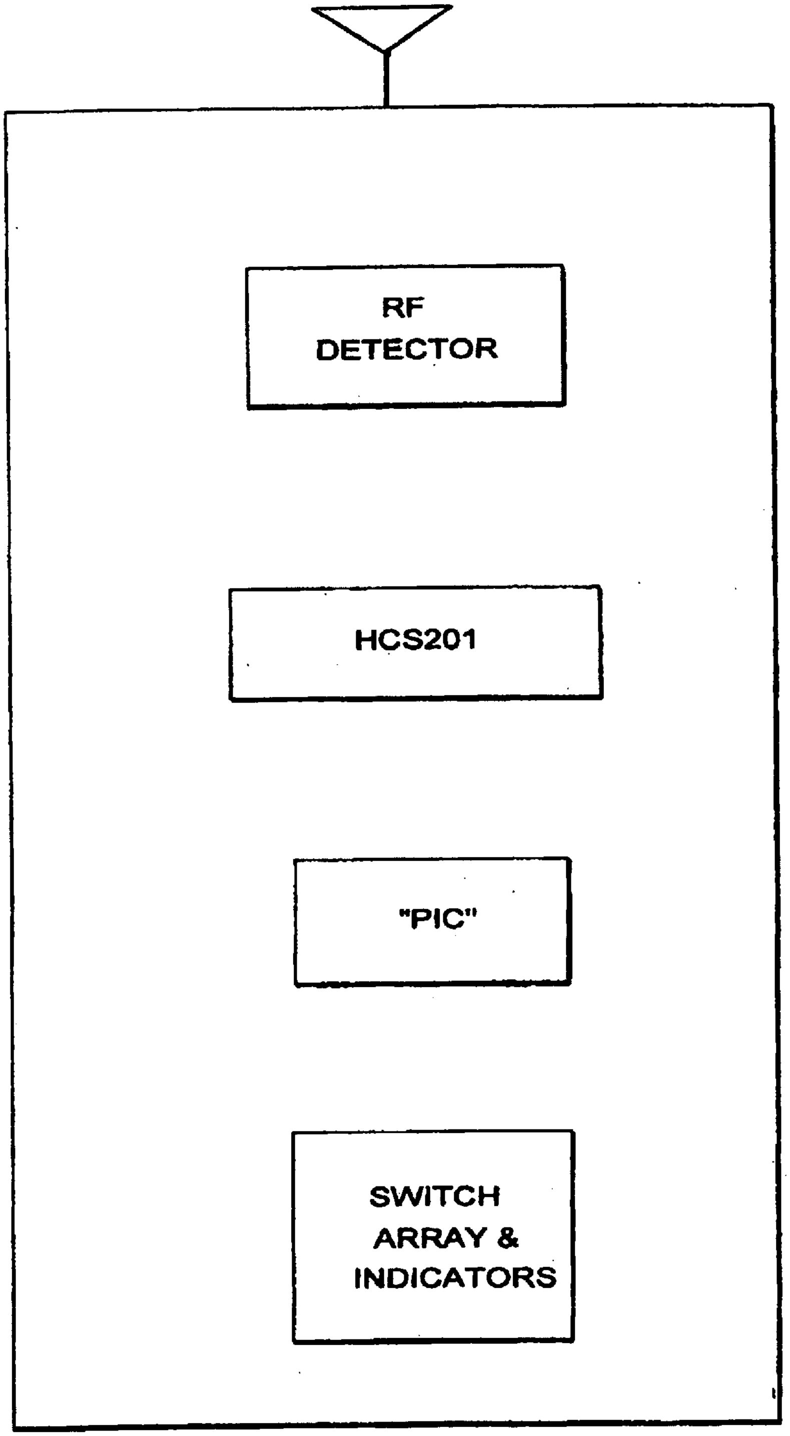
FIG. 5 shows the RF Linked Operational Control Unit.

1.0 The RF Linked Operational Control (FIG. 5) Unit shall allow an operator to send commands to the Motor Control Units (MCU).

2.0 Software Operating Requirements

A "PIC" micro controller shall perform the interfacing between an 12 button keypad, a LED device and a data transmitting circuit needed to send keypad information to the Door Motor Controller.

2.1 The Following specifications may apply:

2.1.1 The Keypad micro controller shall contain all the software needed to emulate the operation of a HCS201 encoder device. (Provided by the MicroChip Corp.)

2.1.2 The Keypad micro controller shall also contain a Serial # code and a Manufacture's ID code used for secure transmitter/receiver link operation.

2.1.3 The Keypad micro controller shall contain non-volatile memory. All operational access codes shall be retained on power down.

2.1.4 The Keypad micro controller shall self activates into a "Sleep" mode (refer section 5.0) after 10 seconds of keypad inactivity (only after initial access code programming is complete, refer section 6.0). The micro controller shall return to a "Wake" mode by the operation of the keypad door switch and shall be indicated by an active LED device.

2.1.5 A blinking LED device shall indicate a Keypad micro controller without any valid access code programming. A constant on LED device shall indicate a Keypad micro controller with a valid access code.

3.0 Hardware Configuration

1.) A "PIC" micro controller

2.) Keypad switches

3.) Panel Light 4.0. I/O configuration

TABLE 4.1

| Inputs (qty) | Purpose |
|---|---|
| 1. Row switches (4) | Used to determine depressed switch identity. |

TABLE 4.2

| Outputs (qty) | Purpose |
|---|---|
| 1. Column signal (4) | Used in conjunction with Row switches. |
| 2. Operational Light (1) | Used to indicate keypad status. |
| 3. Serial Data (1) | Send/Receive serial data from the "HCS201" encoder. (refer to section 9.0 for details) |
| 4. Clock Signal (1) | Sync signal used in conjunction with Serial Data. |

5.0 Sleep/Wake Operation

The ROCU shall operate in two (2) modes.

5.1 Mode 1 shall be defined as "sleep". The ROCU should draw minimum current and should not respond to any keypress operation. Mode 1 shall only be activated after a period of no keypress activity for 10 seconds regardless of the ROCU panel door position.

5.2 Mode 2 shall be activated with the operation of the ROCU panel door. Mode 2 shall be defined as "wake". The Rocu shall operate at normal current draw and shall respond to any/all keypress operations.

6.0 Code Programing

The ROCU usually requires an initialization routine for proper operation.

This routine comprises the entry of a "owner/operator" password which is stored in non-volatile memory.

A password is preferably defined as a set of one(1) to a maximum of eight (8) numeric digits entered consecutively followed by the depression of the "light" key.

7.0 Button(Keys) Operation & Lights Keys 7.1 "Light" key:

This key will initiate a "turn light on" command to the MCU if depressed prior to any other key.

This key will terminate a password code programming sequence if depressed as the final key in the sequence.

7.2 Numeric (0–9) Keys

These keys are used to enter the password code.

7.3 The "R" and "L" Keys

This key shall initial a "door movement command" if depressed following the depression of a set of numeric keys*. (*Note: The set of numeric keys depressed must match a store set of numeric keys held in memory.)

8.0 ROCU Software (Keypad)

The ROCU software described in this section will be loaded into a MicroChip #PIC16F84 device. This device has 2K(×12) bytes of user program memory. A Memory Map details the location of the program within this memory space.

8.1 Program Routines

| | Main | Purpose |
|---|---|---|
| 1. | Init | load/set all program operating parameters |
| 2. | Main Loop | program flow control |
| 3. | Keypress | used to translate keypress to ROCU commands |
| 4. | Talk | used to send data to HSC200 |
| 5. | Save | used to save password info to memory |
| 6. | Retrieve | used to retrieve password info from memory |
| | **SubRoutines** | **Purpose** |
| 1. | Time delays | controls time delays within routines |
| 2. | Validation | handles password validation |

Figure 6:
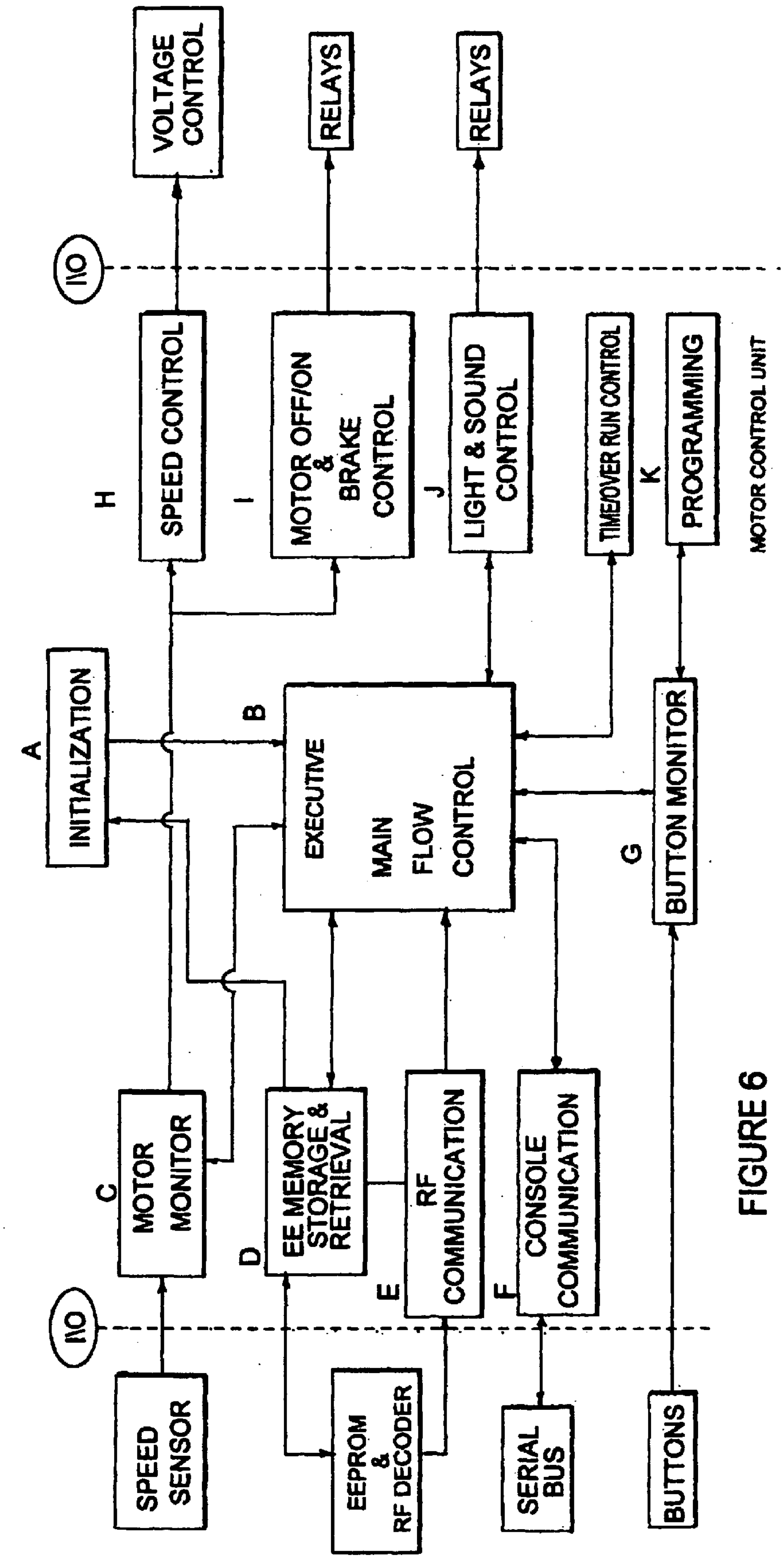
FIG. 6 is a schematic of the Motor Control Unit Software

VI. MCU Software Operation (FIG. 6)

The Motor Control Unit (MCU) operational program is comprised of one main executive loop routine which controls the operations of the GDO system by handing off various control task to numerous specialized routines.

The following table is the processor input/output (IO) pin reference.

| Input | | | |
|---|---|---|---|
| **Pin#** | **Active Level (note 1)** | **Purpose** | **Attention Request Condition** |
| 10 | LO | Program Button | depressed |
| 11 | LO | Plus Button | depressed |
| 12 | LO | Minus Button | depressed |
| 13 | HI | Terminal Address Switch 1 | open (note 2) |
| 14 | HI | Travel Limit Switch | open (door fully up) |
| 15 | LO | IR Detector Signal | obstruction detected |
| 16 | — | Speed Sensor Device | pulsing |
| 17 | HI | Terminal Address Switch 2 | open (note 2) |
| **Output** | | | |
| **Pin#** | **Default Level (note 3)** | **Purpose** | **Normal Condition** |
| 18 | LO | Motor Forward control | Off |
| 19 | LO | Motor Reverse control | Off |
| 20 | LO | Motor Speed control | (slow speed) |
| 21 | LO | Light Control | Off |
| 22 | LO | Sound Control | Off |
| 23 | LO | Brake Control | inactive |
| 24 | HI | HCS500 Device Reset | Disable |

-continued

| Pin# | Default Condition & Level (note4) | | Purpose |
|---|---|---|---|
| | Bi-Directional | | |
| 6 | Output | LO | Wall Console Data communication bus |
| 7 | Input | Hi-Impedance | Wall Console Serial Clock bus |
| 8 | Input | Hi-Impedance | HCS500 Data communication bus |
| 9 | Output | LO | HCS500 device Serial Clock bus |

(note 1: Level at which the input is requesting attention from the processor.)
(note 2: Factory set condition.)
(note 3: Level which will cause the Normal Condition.)
(note4: Level which is set at power up and maintained if no interaction is required.)

Figure 7:
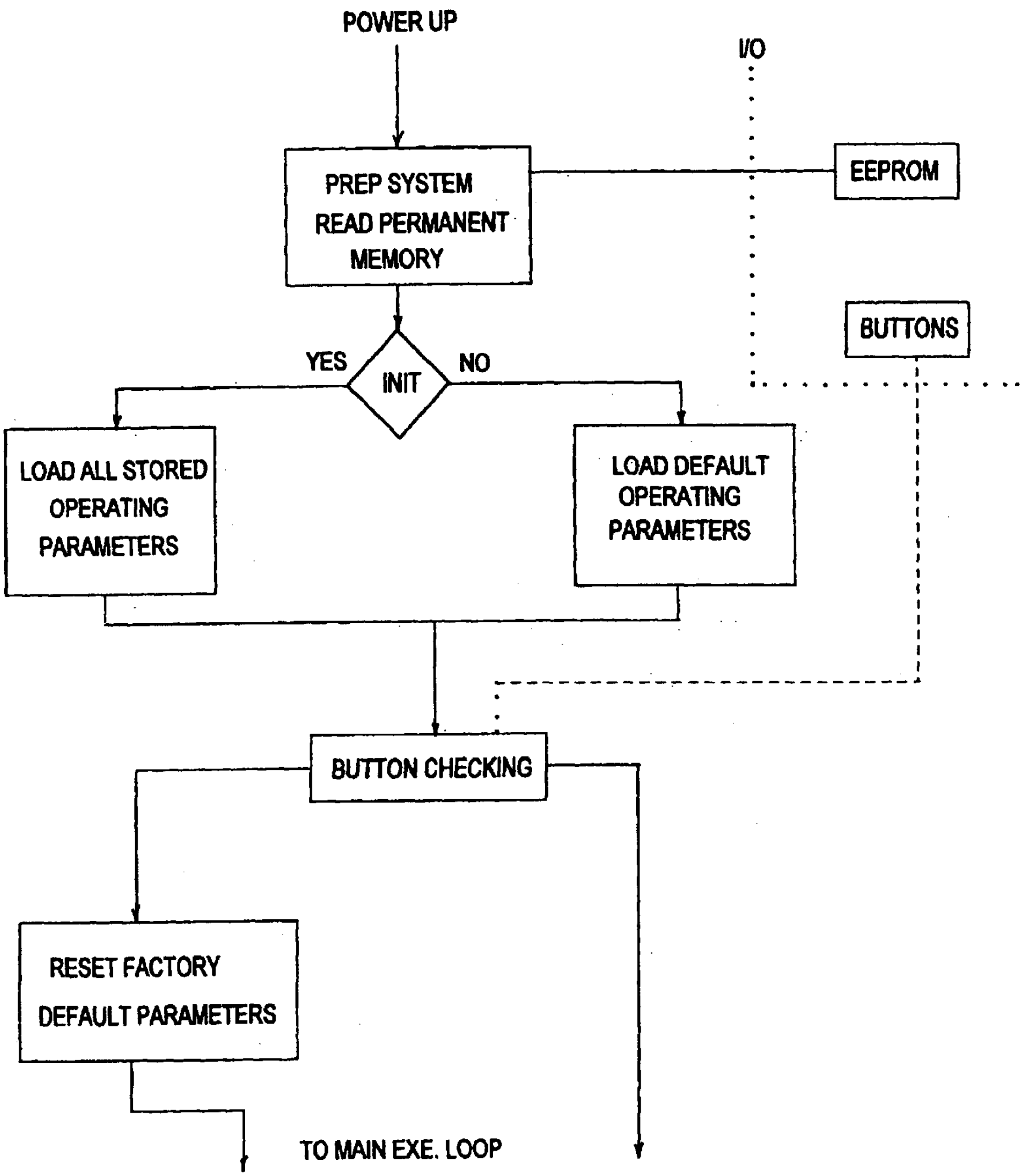
FIG. 7 is a schematic drawing of the Initialization of the Motor Control Unit System.

1.0 Initialization (FIG. 7)

Figure 8:
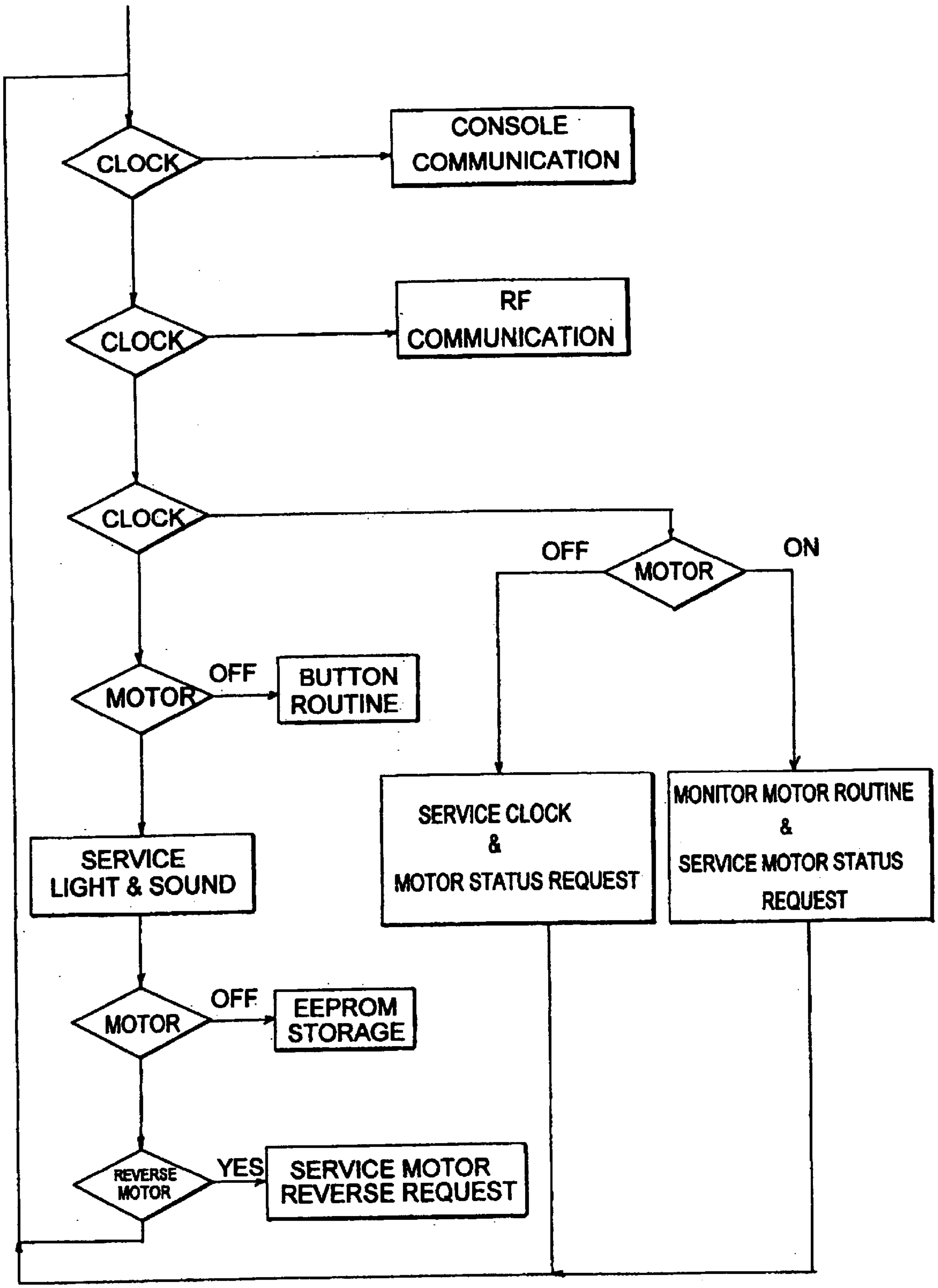
FIG. 8 shows the Main Executive portion of the Motor Control Unit Software program.

At power up the micro controller should:

1. Clear all user memory and bring all Outputs to a low voltage state.
2. Read EEprom (Retrieve routine) and hold all values.
3. Check the "initialization" flag returned from the EEprom:
   If set load all values retrieved from EEprom into the system working memory.
   Or
   If not set load all default operating values in the working memory
   And active the sound device.
4. Read the Button switches:
   If active reset all operating values in the working memory to the default setting
   And active the sound device.
5. Set the following flags
   1. light flash
   2. send a clear the console message
   3. door up
6. Clear the master clock.
7. Wait 100 ms for all the other peripheral to power up.
8. Turn the sound device off.
9. Proceed to Main Executive 2.0 Main Executive (FIG. 8)

The Main Exe routine will (in the following order):

1. Monitor the console data bus and
   If an attention signal is present will check the master clock
   If time allows will jump to the Console Receive Communication routine.
2. Monitor the RF data bus and
   If an attention signal is present will check the master clock
   If time allows will jump to the RF Communication routine.
3. Check the Console Transmit flag
   If set check the motor status and
   If the motor is off jump to the Console Send Communication routine.
4. Check the Motor and
   If off jump to the Time/Overun routine.
5. Check the Master Clock and
   If the master clock equals the Alarm setting jump to the Motor Monitor routine.
6. Check the Motor and
   If off check the buttons and
   If any are active jump to the Button routine.
7. Jump to the Light and Sound Service routine.
8. Check the Motor and
   If off check the Write to EEprom flag and
   If set jump to the EEprom Store routine.
9. Jump to the Reverse Motor routine.
10. Return to section 1.

Figure 9:
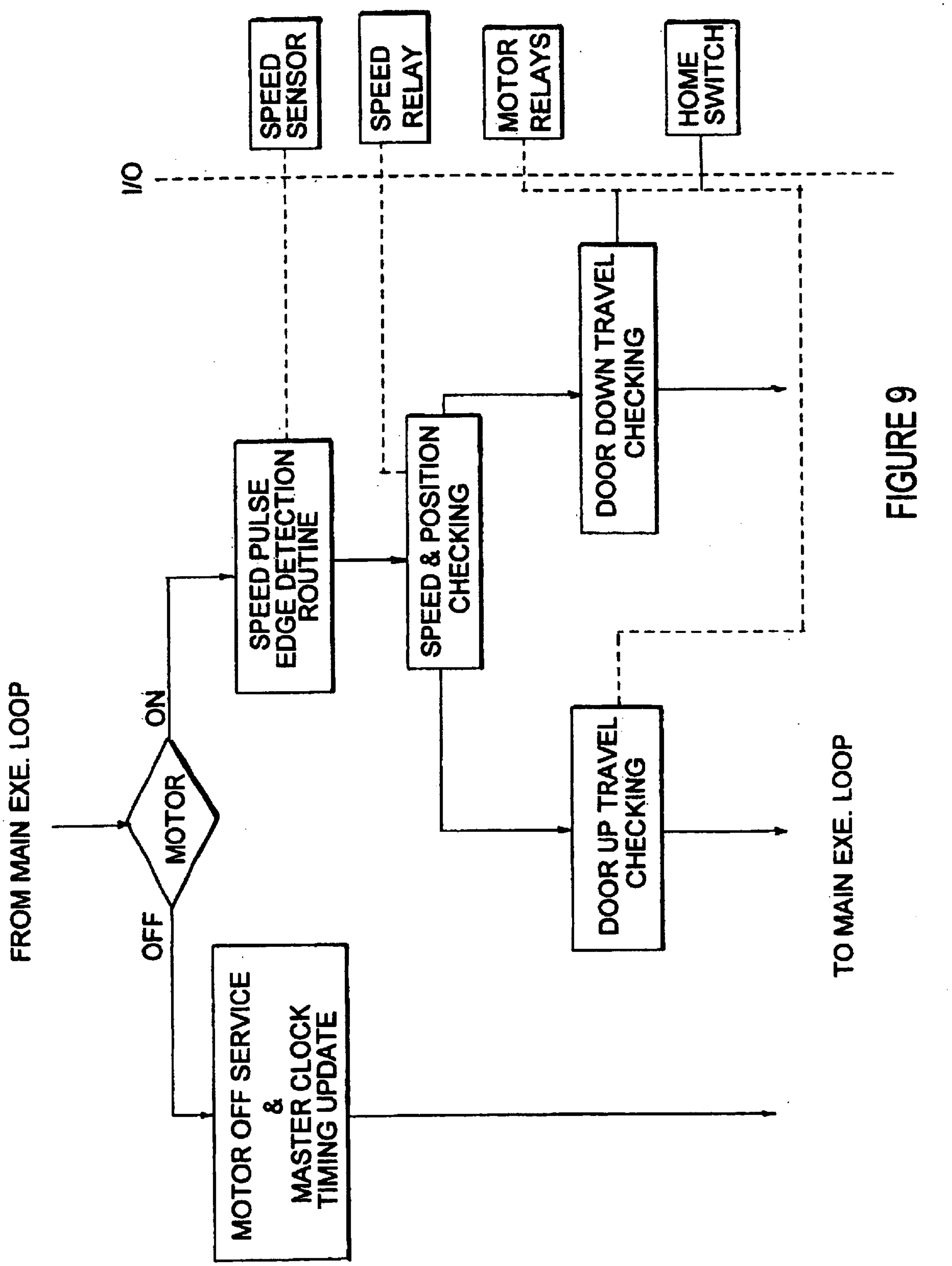
FIG. 9 shows the Motor Monitor of the present invention.

3.0 Motor Monitor (FIG. 9)

This preferred routine determines the status of the Motor using the motor flags and A. If OFF
   1. Wait for the master clock to reach 64 ms and
      1. reset the master clock (usclock) and reset the clock change flag
      2. increment the secondary clock (msclock)
      3. increment the sound counter
   2. Check the Motor request flags and
      If any are set jump to the Motor On routine.

B. If On
   1. Jump to the Sense Pulse Edge Detection routine and
      1. synchronize the master clock to the HI going speed sensor pulse edge.
      2. perform all the function of section A.1 above
      3. Store the current door speed
      4. Adjust the door positional counter
   2. Calculate the door speed tolerance window and
      If out of tolerance perform the following:
         1. turn off the motor power and clear the motor flags.
         2. set the appropriate error flags
         3. signal a console message using the transmit flag.
         4. set flash light flag on.
         5. turn on the sound device.
   3. Determine if a motor speed change is required.
   4. (Based on the door direction) check any/all the following:
      1. the travel limit switch.
      2. the Max travel vs. position value.
      3. the IR detection status.
      4. the pass limit switch counter.
      5. the motor off request flag.
   And If required by any of these conditions perform any/all of the following:
      1. turn off the motor and clear the motor flags.
      2. set the error and console transmit flags.
      3. set the flash light flag.
      4. set the sound device on.

Figure 10:
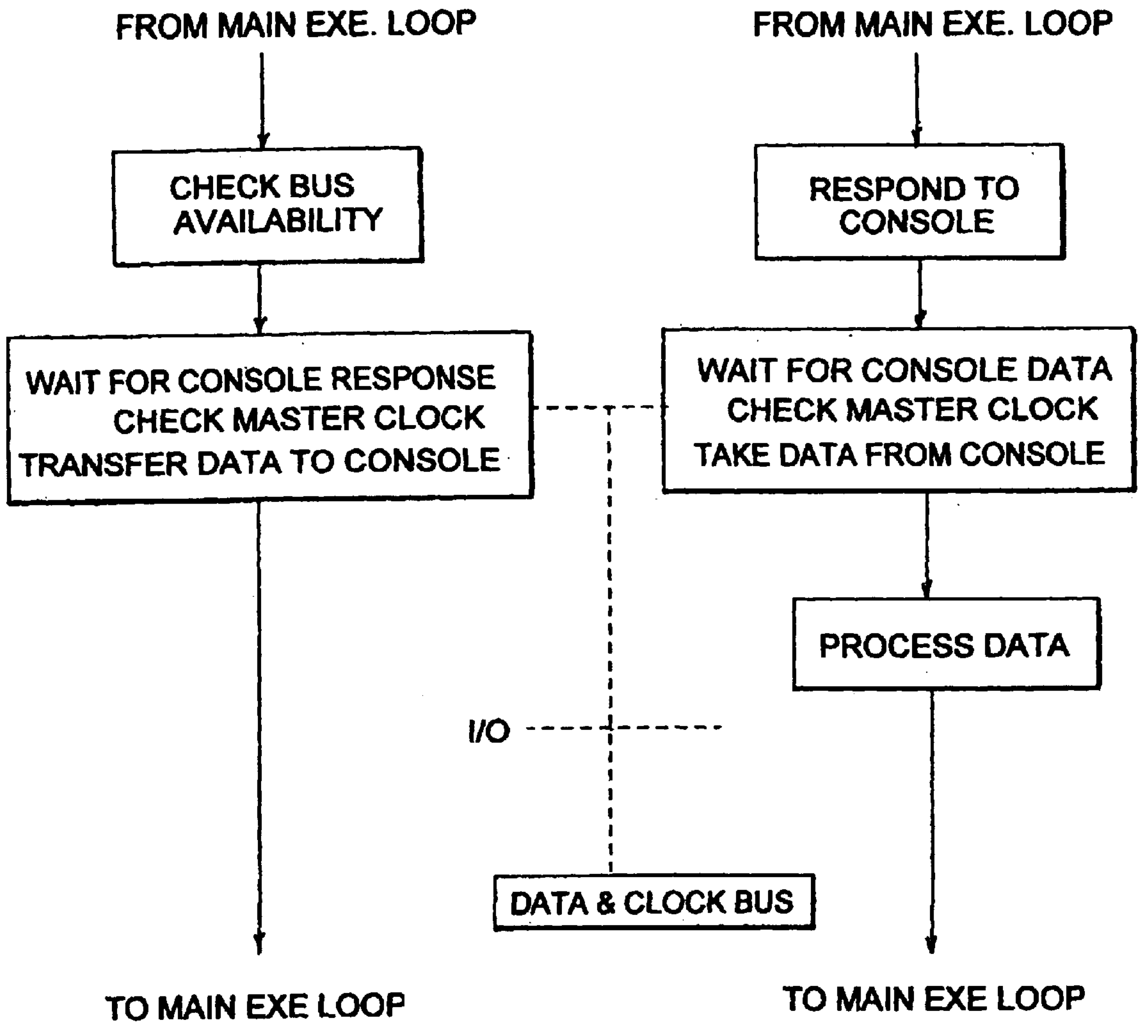
FIG. 10 shows the Console (Send & Receive) Communication function of the Motor Control Unit System of the present invention.

4.0 Console (Send & Receive) Communication (FIG. 10)

These routines will either

A. Send data to the console unit
   If a transmission is required the following will take place.
The data bus will be checked for availability and
   If available
   1. A clock bus attention signal will be trigger on the bus.
   2. A 50 ms wait for a response will take place.
      (If no response is received this routine is aborted)
   3. When the response has been acknowledged
      A data transfer will start and proceed to it's conclusion.

OR

B. Receive data from the console unit
   If an attention signal is pending on the clcok bus the following will take place.
   1. A attention response signal will be acknowledged on the data bus.

2. A master clock check will take place.
(If no transfer is started before an alarm is triggered this routine is aborted)
3. all data will be received.
4. a processing routine will decode and set/clear the appropriate flags.

Figure 11:
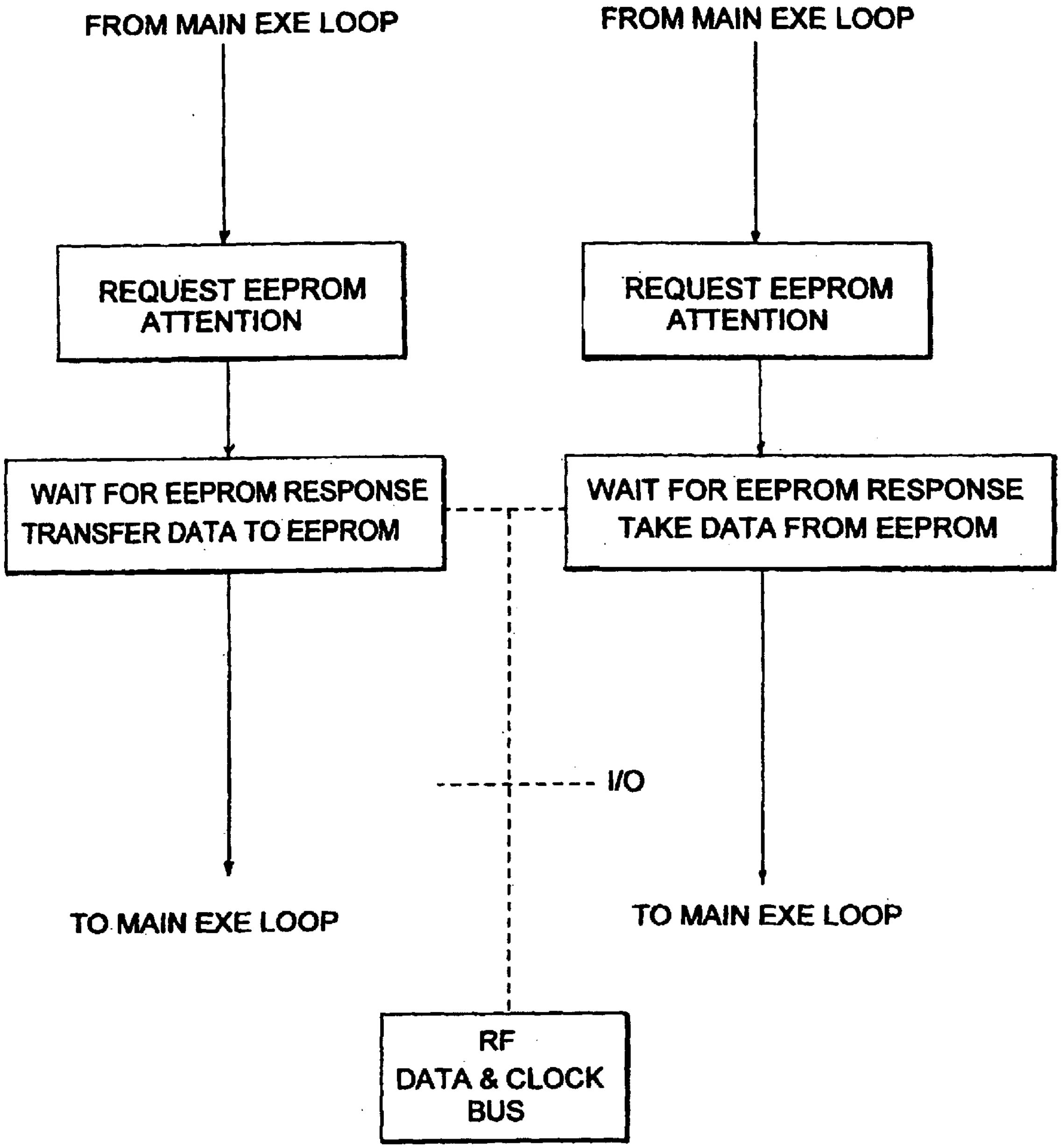
FIG. 11 shows the EEprom Store/Retrieve function of the Motor Control Unit System of the present invention.

5.0 EEprom Store/Retrieve (FIG. 11)

These routines will either

A. Store data to the EEprom (HCS500) unit.

If a EEprom write is required the following will take place.
1. A clcok bus attention signal will be trigger on the bus.
2. A 1.2 ms wait for a response will take place.
(If no response is received this routine is aborted)
3. When the response has been acknowledged
A data transfer will start and proceed to it's conclusion.

OR

B. Retrieve data from the EEprom (HCS500) unit.

If a EEprom read is required the following will take place.
1. A bus attention signal will be trigger on the bus.
2. A 1.2 ms wait for a response will take place.
(If no response is received this routine is aborted)
3. When the response has been acknowledged
A data transfer will start and proceed to it's conclusion.

Figure 12:
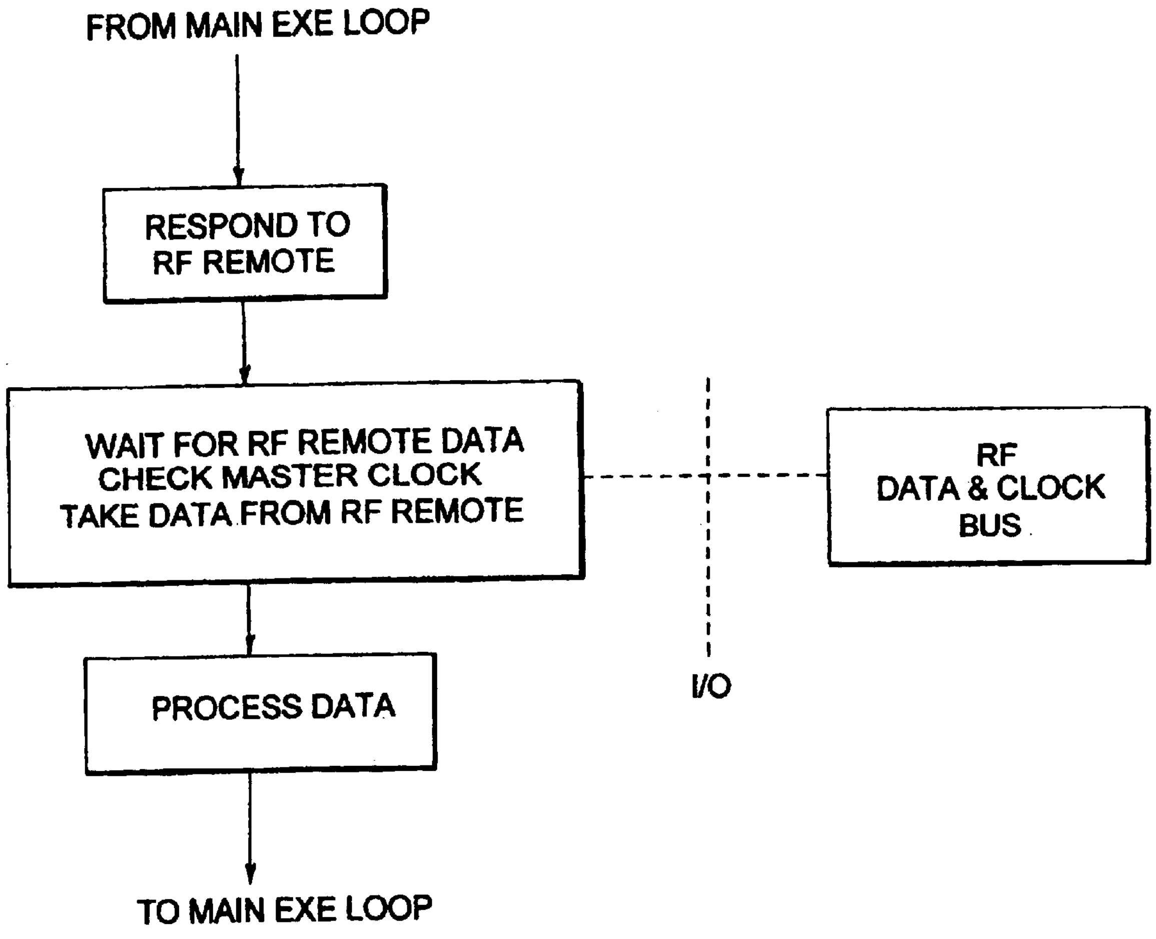
FIG. 12 shows the RF (remote) Communication function of the Motor Control Unit System.

6.0 RF (Remote) Communication (FIG. 12)

This routine will take data from the RF (HCS500) unit.

If an attention signal is pending on the data bus

AND

If the enable flag allows a data transfer the following will take place.
1. A attention response signal will be acknowledged on the clock bus.
2. A master clock check will take place.
(If no transfer is started before an alarm is triggered this routine is aborted)
3. all data will be received.
4. a processing routine will decode and set/clear the appropriate flags.

Figure 13:
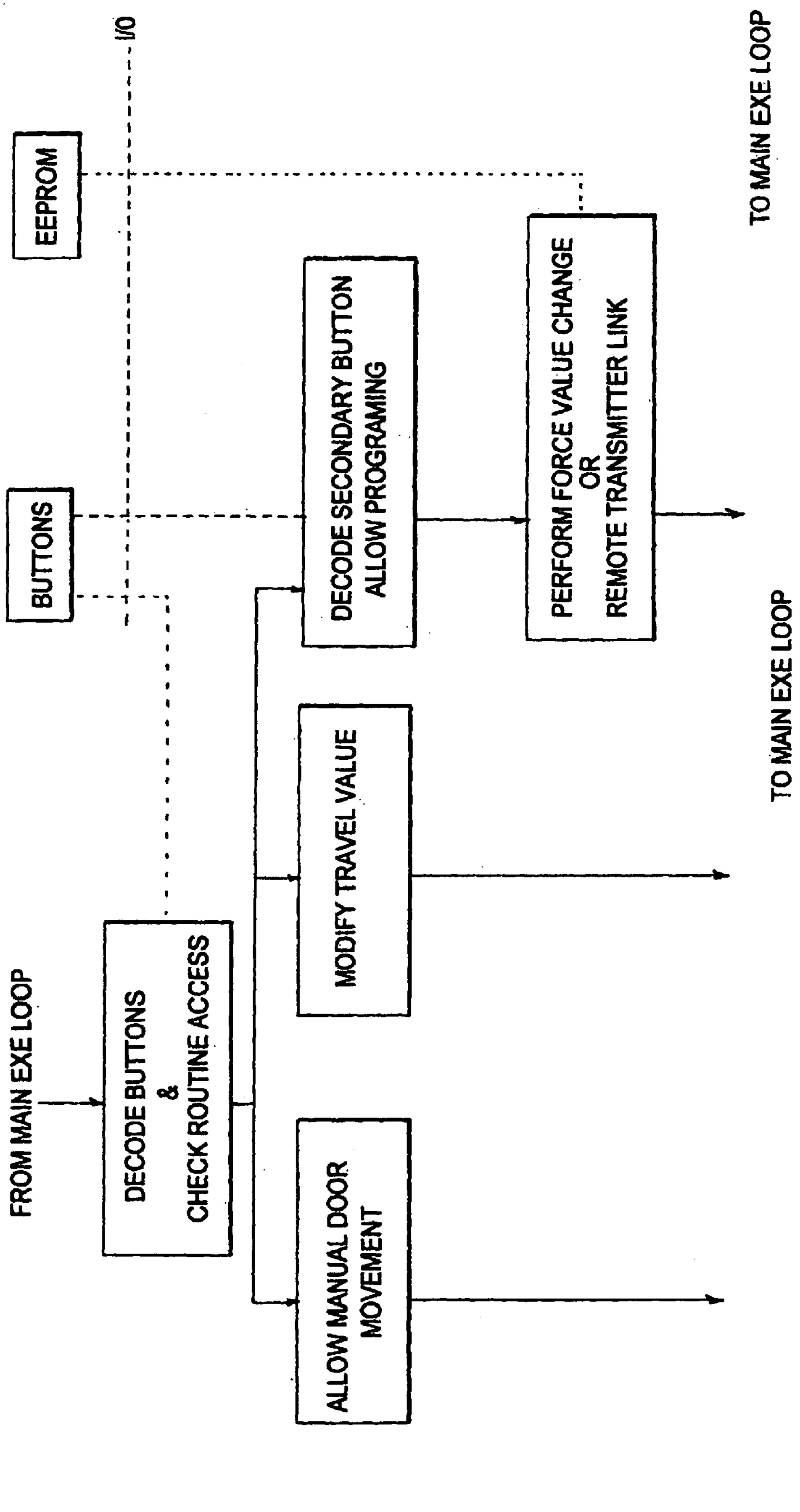
FIG. 13 shows the Button and Programming function of the Motor Control Unit System.

7.0 Button and Programming (FIG. 13)

This routine will monitor the status of the buttons and proceed as follows:

IF either of the "+" or "−" buttons are depressed the following will take place.

A timer will start to determine the length of the button hold down period.

IF the initialization flag allows and the length of hold down time is greater
then ½ seconds the following will take place.
1. power to the motor will be applied based on which button
("+"=down, "−"=up) is depressed.
2. the button is monitor and the moment it's released, power is turned off.
(If the initialization flag is cleared this routine is aborted).

OR

IF the length of hold down time is less then ½ seconds the following will take place.
1. The maximum travel value will be adjusted 1 increment based on which button is depressed.

OR

IF the "program" button is depressed the following will take place.
1. A counter will determine the number of "program" button depressions and based on this number the following table will determine the "+" & "−" button mode functionality.

1st depression=Up force adjustment
2nd depression=Down force adjustment
3rd depression=Transmitter Link or Transmitter Un-Link
4th depression=Routine Exit 2. The "+" button will increment the adjustment OR perform a transmitter link.
3. The "−" button will decrement the adjustment OR perform a transmitter un-link.

Figure 14:
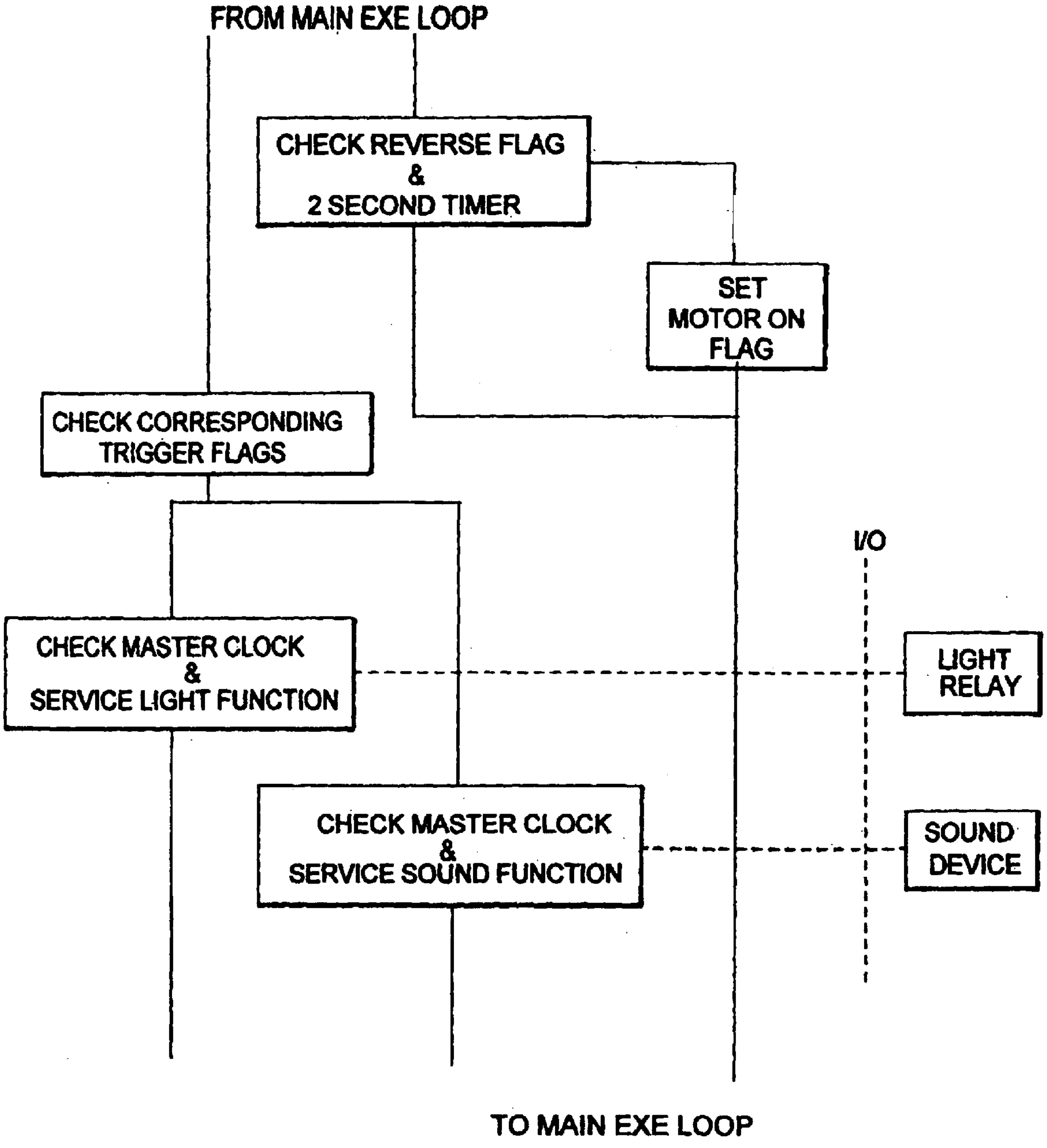
FIG. 14 shows the Light, Sound and Reverse Motor function of the Motor Control Unit System.

8.0 Light and Sound (FIG. 14)

This routine will monitor the status of the system light and sound device using the corresponding flags and proceed as follows:

IF the light flag is set (light=on) the following will take place.
1. the master clock will be compared to the light timer and
If they match the light will be turned off.

IF the light flash flag is set the following will take place.
1. the master clock will be compared to the light timer and
If they match the light will be toggled to it's opposite state.

IF the sound flag is set the following will take place.
1. the master clock will be compared to the sound timer and
If they match the sound will be toggled to it's opposite state.

9.0 Reverse Motor (FIG. 14)

This routine will determine if the motor status needs to be changed and proceed as follows:

IF the reverse flag is set the following will take place.
1. the master clock is monitored to determined a 2 sec elapses time and
2. after 1 seconds the motor on flag is set.

10.0 Time/Overrun (FIG. 14)

This routine will determine if a motor on request flag is set and

IF set will check the number of door operations performed within the pervious allowable time period and if under limit, increase the door operational count.

IF the operational count is over limit, will clear the motor request flag and will start the cool down timer.

IF the motor request flag is clear, will exit this routine.

Figure 15:
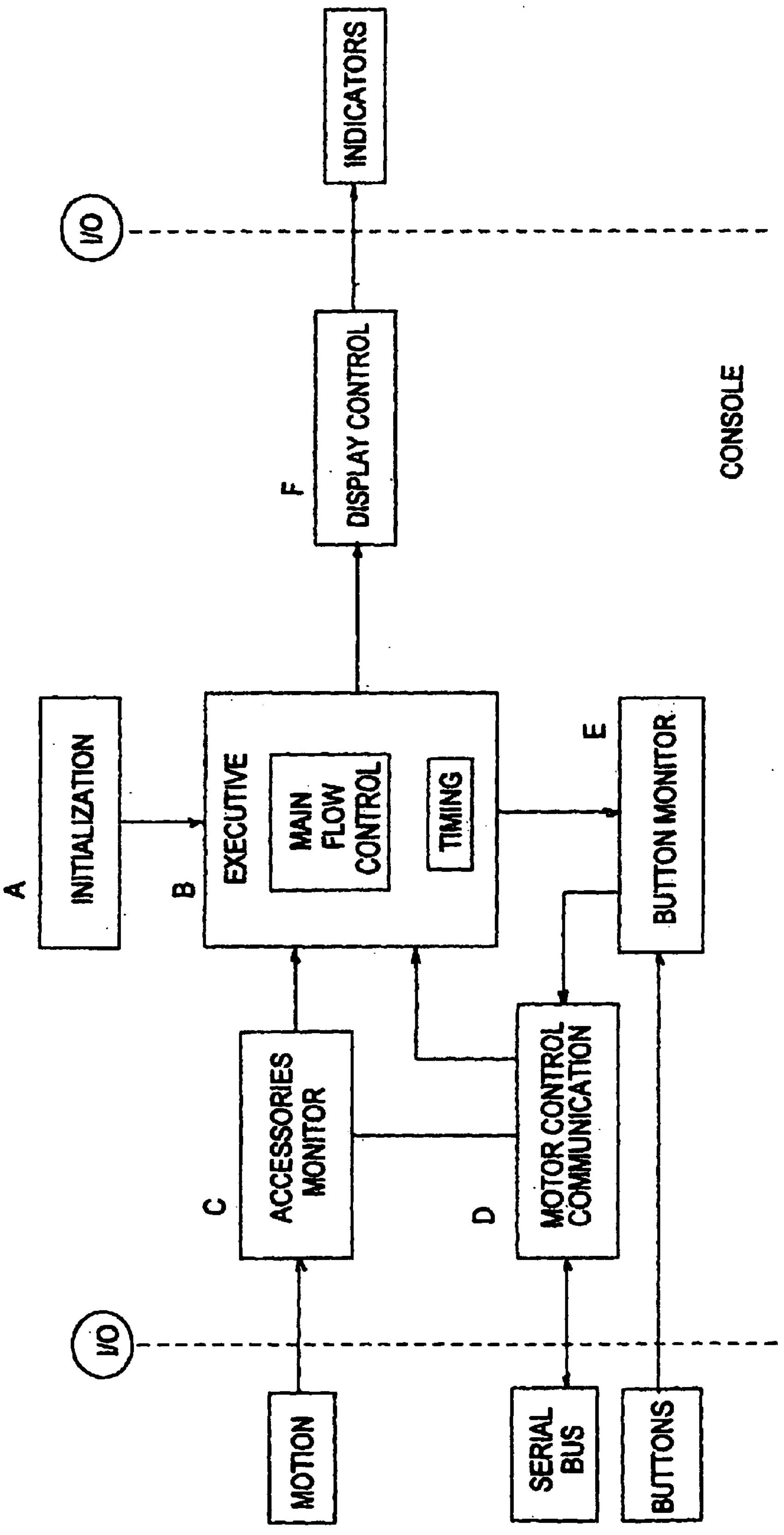
FIG. 15 shows the Operational Control Unit Software of the present invention.

VII. OCU Software Operation (FIG. 15)

The Operational Control Unit (OCU) operational program is comprised of one main executive loop routine which controls the operations of the wall console by handing off various control task to numerous specialized routines.

The following table is the processor input/output (IO) pin reference.

| Input | | | |
|---|---|---|---|
| Pin# | Active Level (note 1) | Purpose | Attention Request Condition |
| 10 | LO | Door On/Off Button | depressed |
| 11 | LO | Lock/UnLock Button | depressed |
| 12 | LO | Sound OFF Button | depressed |

-continued

| | | | |
|---|---|---|---|
| 13 | LO | Light On/Off Button | depressed |
| 16 | LO | Motion Detector | motion detected |
| 17 | HI | Terminal Address Switch | open (note 2) |

Output

| Pin# | Default Level (note 3) | Purpose | Normal Condition |
|---|---|---|---|
| 18 | LO | Lock indicator | Off |
| 20 | LO | Safety indicator | Off |
| 23 | LO | LoBattery Condition | Off |

Bi-Directional

| Pin# | Default Condition & Level (note4) | | Purpose |
|---|---|---|---|
| 6 | Output | LO | Motor Control Data communication bus |
| 7 | Input | Hi-Impedance | Motor Control Serial Clock bus |

(note 1: Level at which the input is requesting attention from the processor.)
(note 2: Factory set condition.)
(note 3: Level which will cause the Normal Condition.)
(note4: Level which is set at power up and maintained if no interaction is required.)

Figure 16:
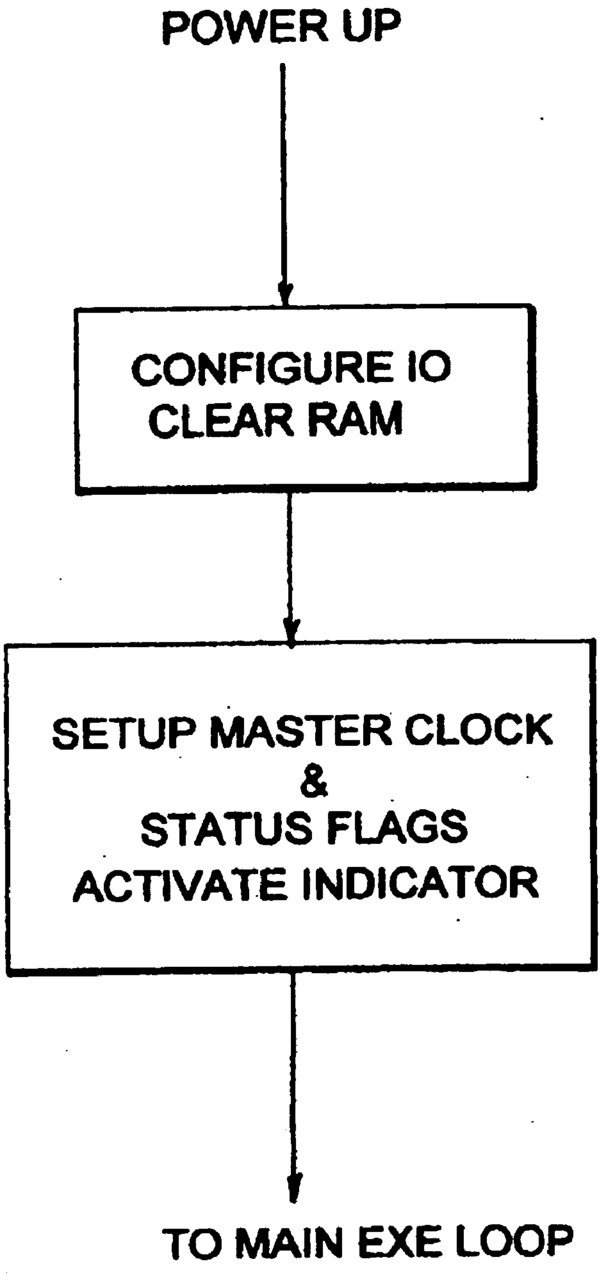
FIG. 16 shows the Initialization of the operational control unit.

1.0 Initialization (FIG. 16)

Figure 17:
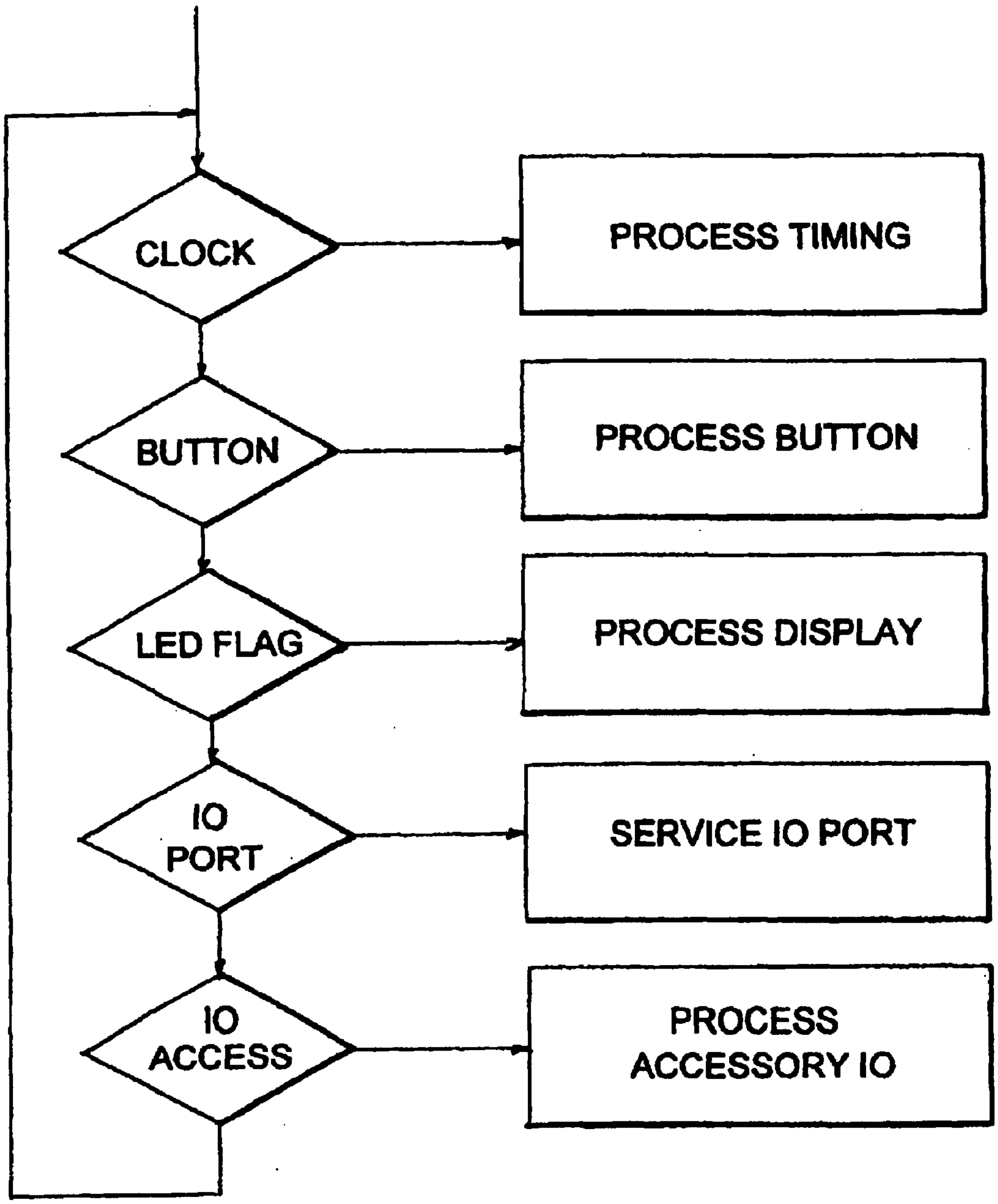
FIG. 17 shows the Main Executive of the operational control unit.

At power up the console will:

1. Clear all user memory and bring all Outputs to a lo voltage state.
2. Turn on the "Safety" indicator
3. Clear the master clock.
4. Proceed to Main Executive 2.0 Main Executive (FIG. 17)

Figure 18:
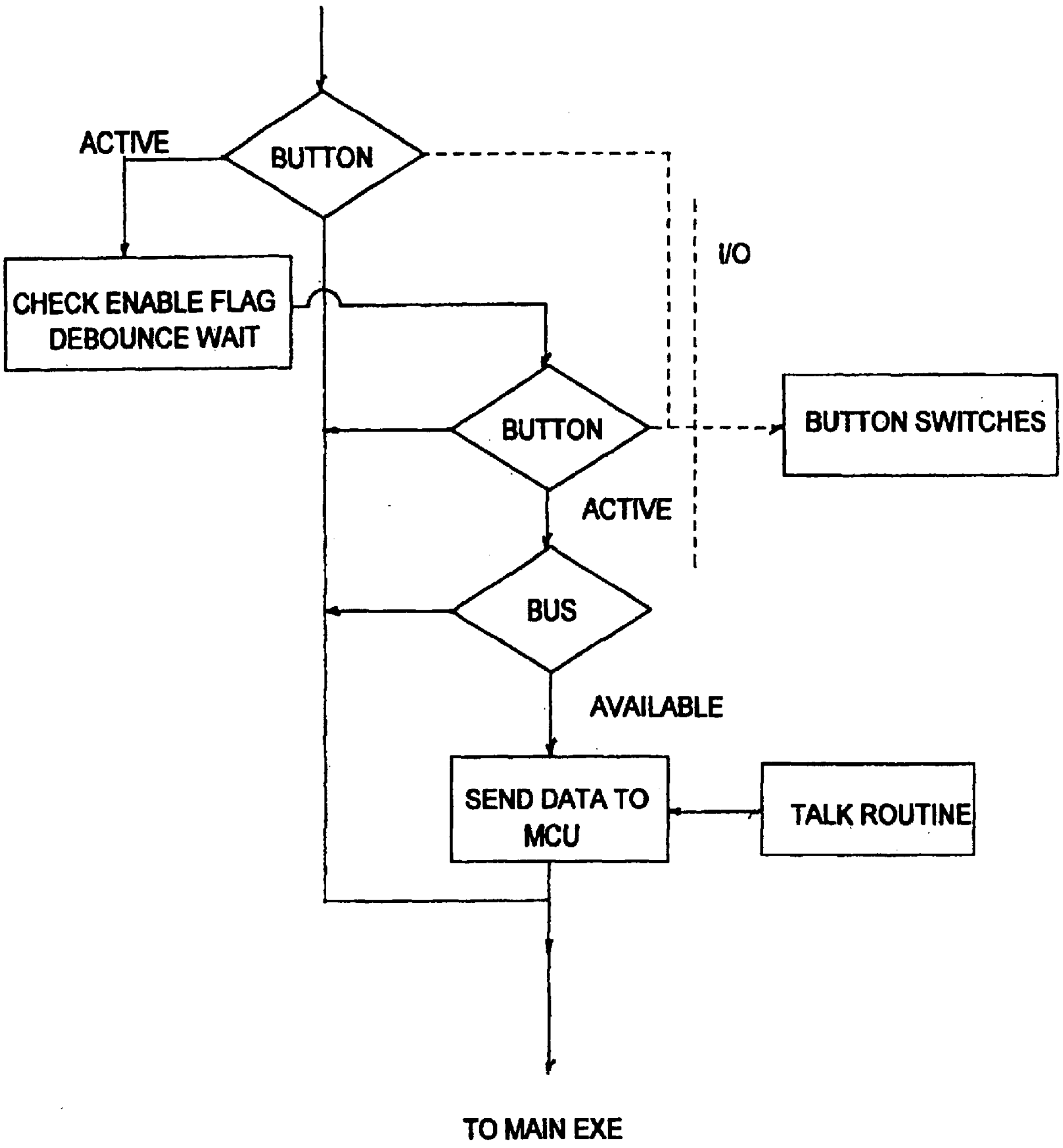
FIG. 18 shows the Button function of the operational control unit.

The Main Exe routine will (in the following order):

1. Check the master clock and
   If a time-out condition has occurred will jump to Process Clock
2. Monitor the Button (FIG. 18) status and
   If depressed will check the switch enable flag and if allowed will
   1. wait 12 ms for switch debounce
   2. recheck the button status and if still depressed
   3. call the Talk routine to send the button command to the MCU
   4. clear the switch enable flag.

Figure 19:
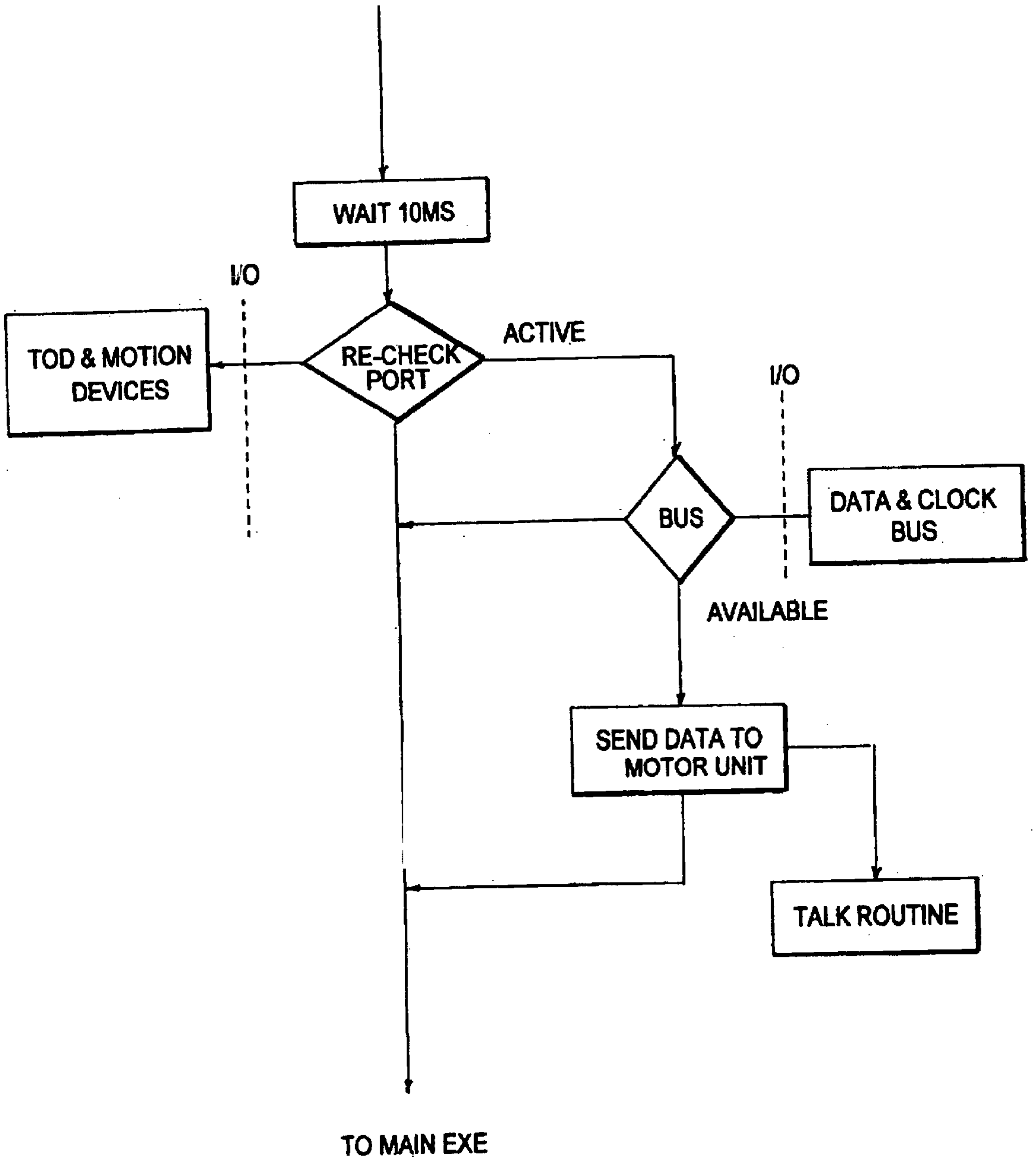
FIG. 19 shows the Accessory function of the operational control unit.

Or if not active set the switch enable flag
3. Check the LED flag and if set will call the Display routine.
4. Monitor the Motor Control Serial Clock bus status and If HI will jump to the Listen routine
5. Monitor the Accessory (FIG. 19) Motion status and
   If attention is requested will check the 4 minute enable flag and if allowed will
   1. wait 10 ms for signal debounce
   2. recheck the Motion status and if still active
   3. call the Talk routine to send the accessory command to the MCU
   4. clear the clear enable flag Or if not active set the accessory enable flag
6. Return to section 1.

Figure 20:
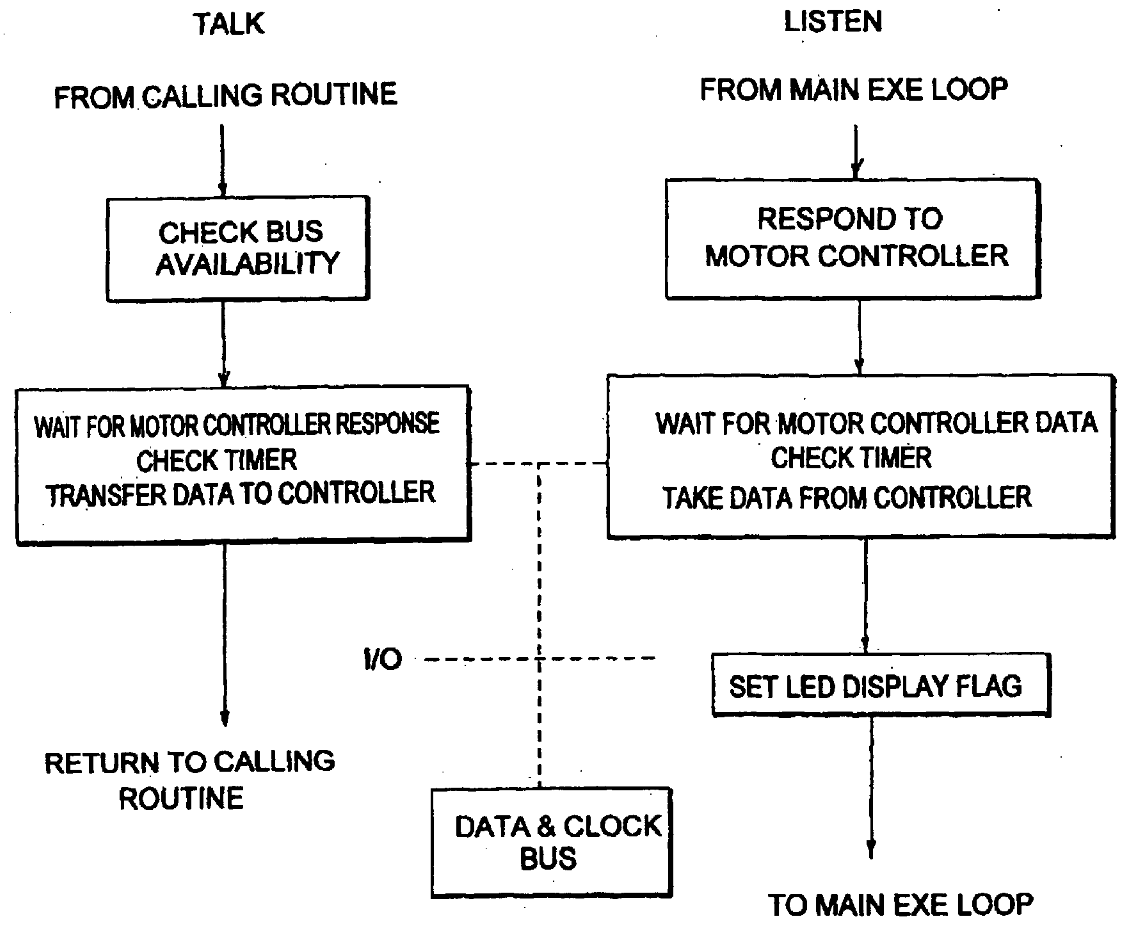
FIG. 20 shows the Communication (Talk, Listen) function of the operational control unit.

3.0 Communication (Talk, Listen) (FIG. 20)

These routines will either

A. send (Talk) data to the motor control unit

If a transmission is required the following will take place.

The data bus will be checked for availability and

If available

1. A attention signal will be trigger on the clock bus.
2. A 200 ms wait for a response will take place.
   (If no response is received this routine is aborted)
3. When a response has been acknowledged on the data bus
   A data transfer will start and proceed to it's conclusion.

OR

B. receive (Listen) data from the motor control unit

If an attention signal is pending on the clock bus the following will take place.

1. A attention response signal will be acknowledged on the data bus.
2. A 200 ms wait for a response will take place.
   (If no transfer is started this routine is aborted)
3. all data will be received.
4. the LED display flag will be set.

Figure 21:
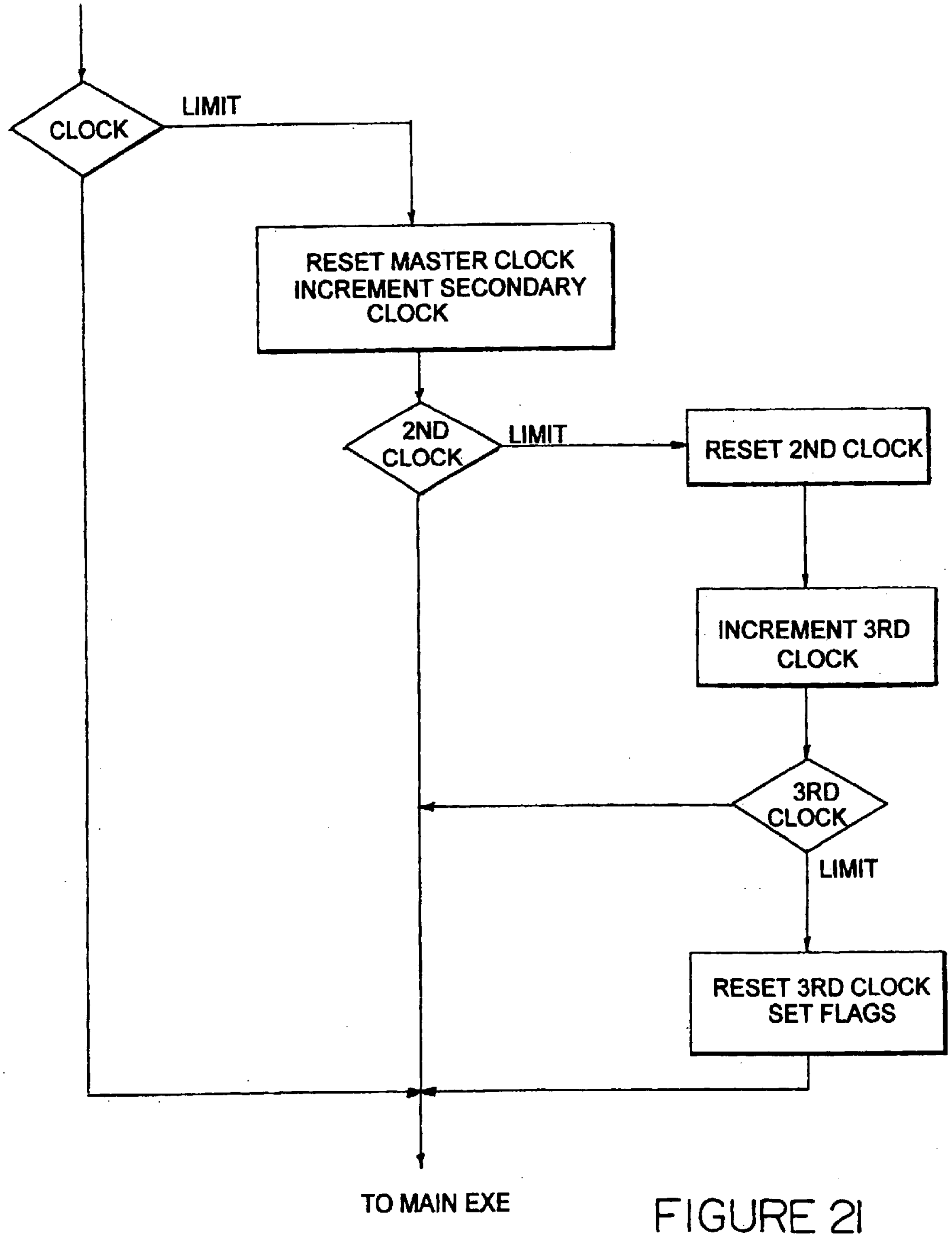
FIG. 21 shows the Process Clock function of the operational control unit.

4.0 Process Clock (FIG. 21)

The Clock Process routine will:

1. Reset the master clock and increment the secondary clock.
2. Check if the secondary clock equals a present limit and if it is will:
   1. reset the secondary clock and increment the third clock.
   2. check if the third clock equals a present limit and if it is will:
      1. reset the third clock and reset 4 minute flag.

Figure 22:
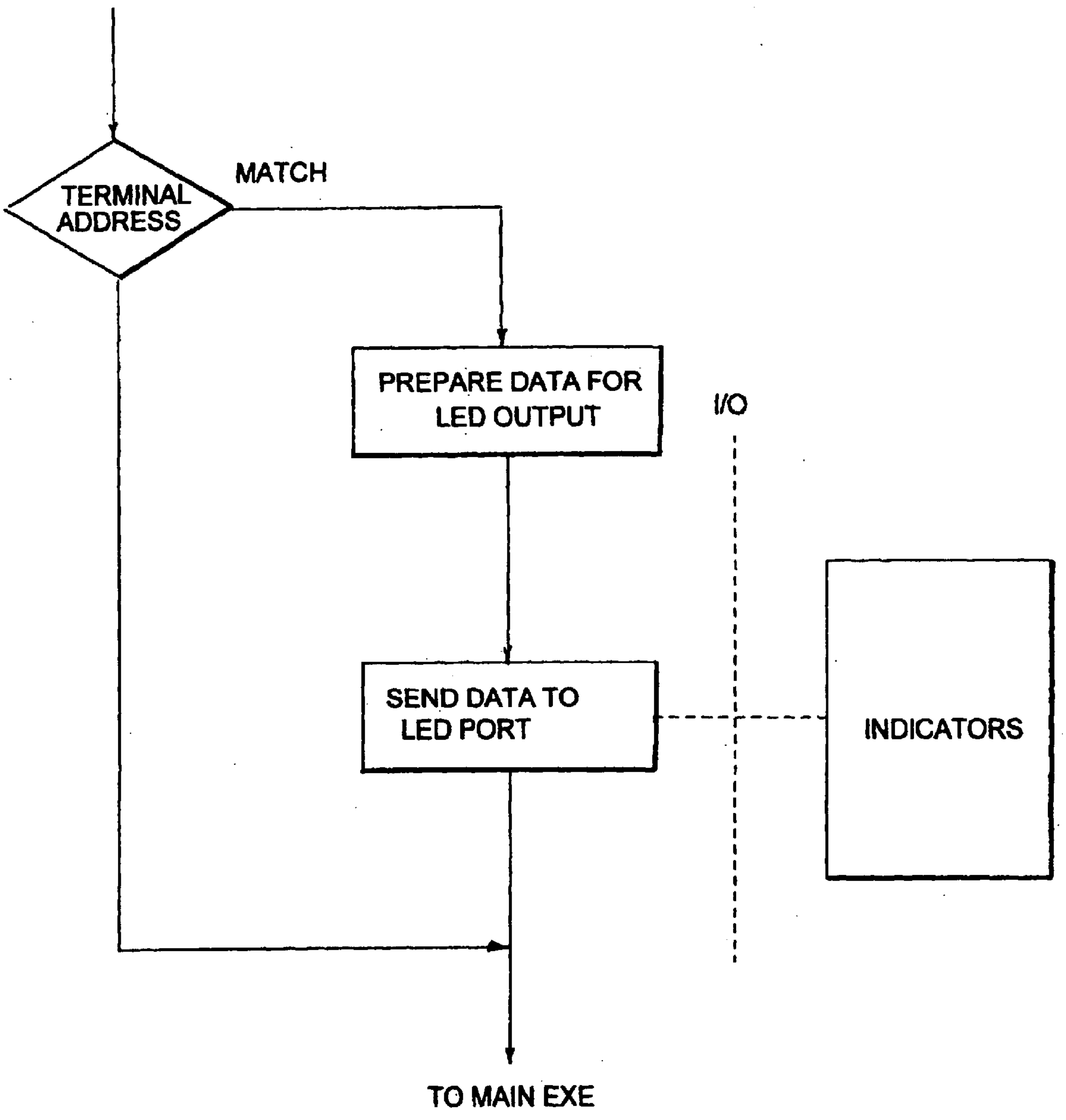
FIG. 22 shows the Display function of the operational control unit.

5.0 Display (FIG. 22)

If the LED flag is set this routine will apply all stored received motor data to the indicator Output and clear the LED flag.

Figure 23:
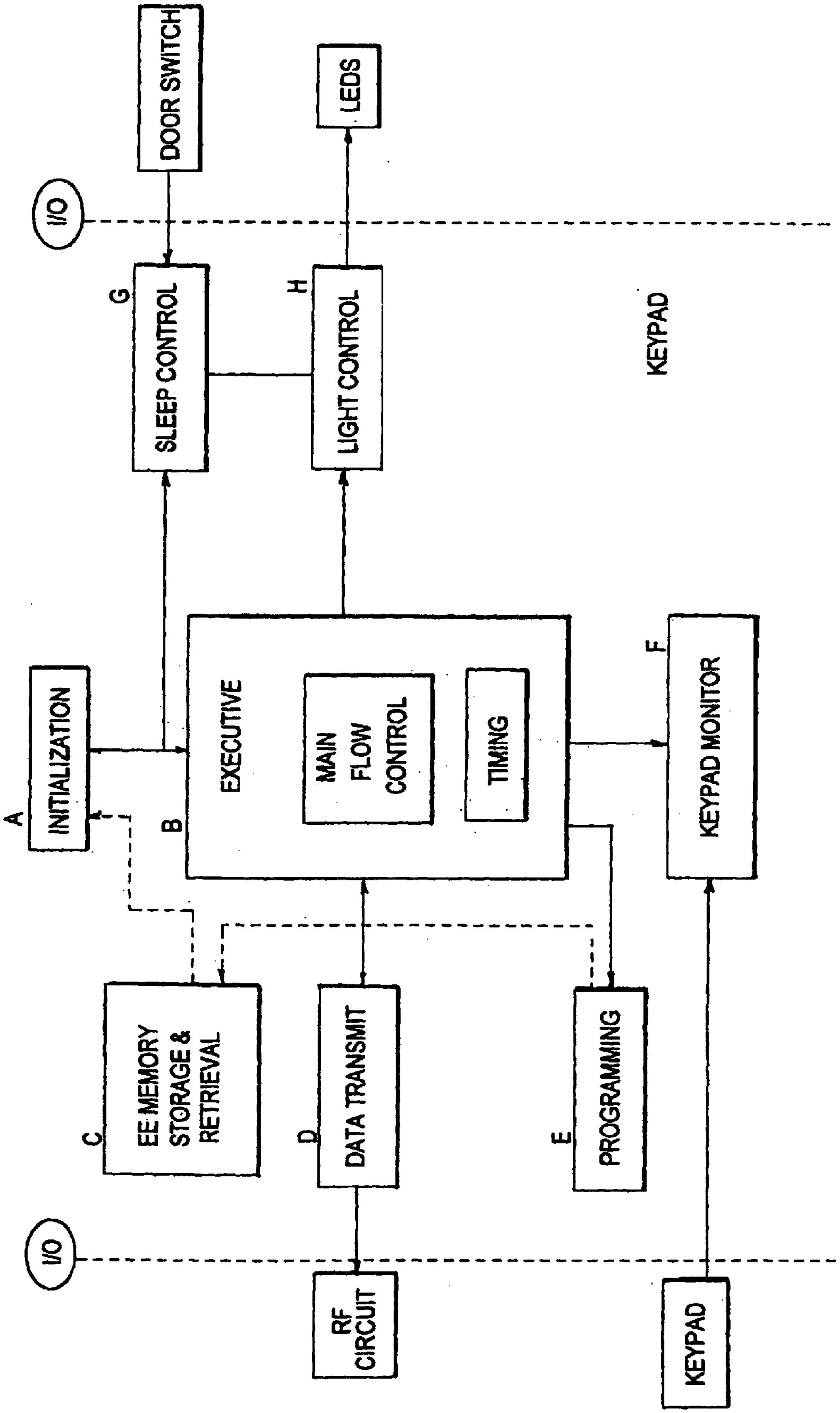
FIG. 23 shows the Remote Operational Control Unit Software Operation.
Figure 24:
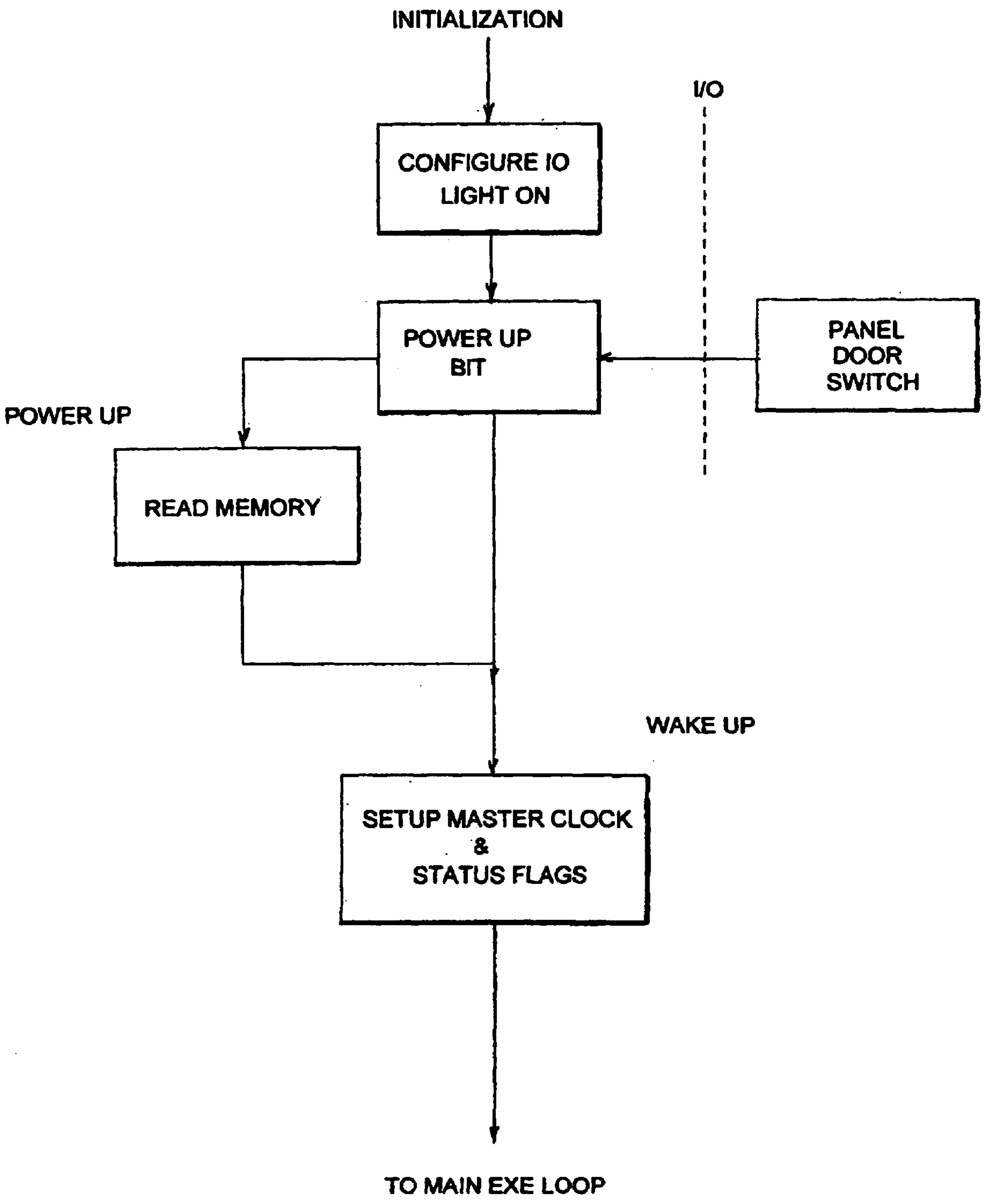
FIG. 24 shows the initialization function of the Remote Operational Control Unit Software Operation.

VIII. ROCU Software Operation (FIG. 23)

The Remote Operational Control Unit (ROCU) operational program is comprised of one main executive loop routine which controls the operations of the keypad by handing off various control task to numerous specialized routines.

The following table is the processor input/output (IO) pin reference.

Output

| Pin# | Default Level (note 1) | Purpose | Normal Condition |
|---|---|---|---|
| 3 | HI | Master clear enable | disabled |
| 6 | LO | RF data signal 0 | Off |
| 7 | LO | RF data signal 1 | Off |
| 8 | LO | RF data signal 2 | Off |
| 9 | HI | Panel Indicator Light | On |
| 10 | HI | "Light" button | Column 0 write |
| 11 | HI | "3","6","9","R" button | Column 1 write |
| 12 | HI | "2","5","8","0" button | Column 2 write |
| 13 | HI | "1","4","7","L" button | Column 3 write |

Input

| Pin# | Active Level (note 2) | Purpose | Attention Request Condition |
|---|---|---|---|
| 17 | HI | "R","0","L" | Row 0 read |
| 18 | HI | "9","8","7" | Row 1 read |

-continued

| | | | |
|---|---|---|---|
| 1 | HI | "6","5","4" | Row 2 read |
| 2 | HI | "Light","3","2","1" | Row 3 read |

Keypad Matrix Value

| Stored Hex Value | Level@ Column# 3 2 1 0 | Level@ Row# 3 2 1 0 | IF Key Depressed |
|---|---|---|---|
| 18 | 0 0 0 1 | 0 0 0 1 | light (this key not stored) |
| 21 | 0 0 1 0 | 0 0 0 1 | R (this key not stored) |
| 22 | 0 0 1 0 | 0 0 1 0 | 9 |
| 24 | 0 0 1 0 | 0 1 0 0 | 6 |
| 28 | 0 0 1 0 | 1 0 0 0 | 3 |
| 41 | 0 1 0 0 | 0 0 0 1 | 0 |
| 42 | 0 1 0 0 | 0 0 1 0 | 8 |
| 44 | 0 1 0 0 | 0 1 0 0 | 5 |
| 48 | 0 1 0 0 | 1 0 0 0 | 2 |
| 81 | 1 0 0 0 | 0 0 0 1 | L (this key not stored) |
| 82 | 1 0 0 0 | 0 0 1 0 | 7 |
| 84 | 1 0 0 0 | 0 1 0 0 | 4 |
| 88 | 1 0 0 0 | 1 0 0 0 | 1 |

(note 1: Level which will cause the Normal Condition.)
(note 2: Level at which the input is requesting attention from the processor.)

The Power up bit is read and either routine A or B is performed.

A. At POWER UP the keypad will:
1. Configure the IO port.
2. Clear all user memory and bring all Outputs to a lo voltage state.
3. Call the Retrieve routine, read the permanent memory & load ram
4. Set the panel light (refer to as the "indicator") to Blinking mode.
5. Clear the master clock.
6. Proceed to Main Executive B. At WAKE UP (note 1) the keypad will:
1. Configure the IO port.
2. Clear all user memory and bring all Outputs to a lo voltage state.
3. Set the panel light (refer to as the "indicator") as determined by the Indicator flags.
4. Clear the master clock.
5. Proceed to Main Executive NOTE 1: The keypad is programmed to execute a SLEEP mode of operation where as all ram memory is retained. "WAKE UP" is a return from this SLEEP mode.

Figure 25:
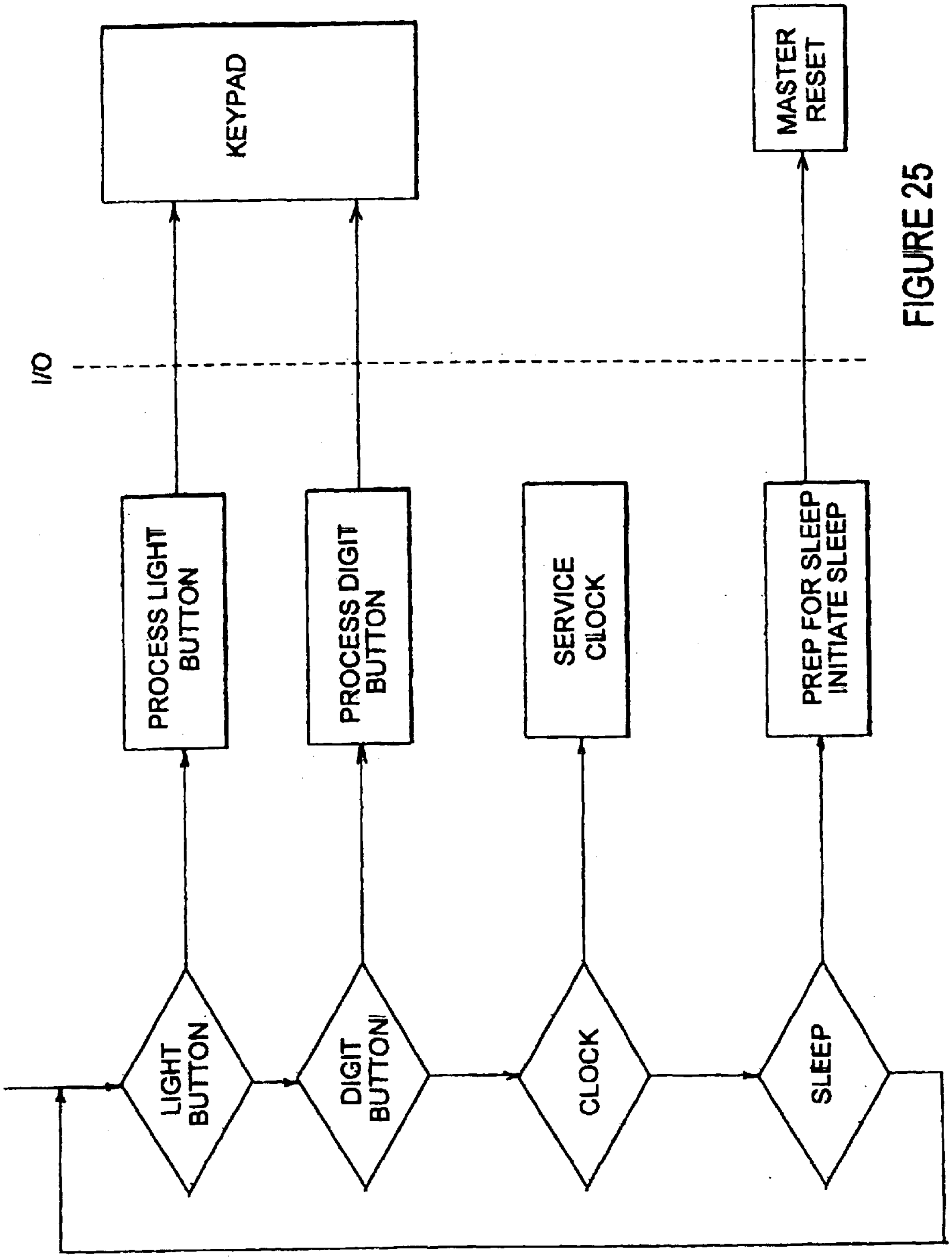
FIG. 25 shows the main executive function of the Remote Operational Control Unit Software Operation.

2.0 Main Executive (FIG. 25)

The Main Exe routine will (in the following order):

1. Active a Column 0 write and Monitor the "Light" button and if active call the LightSw_ck routine and then perform one of the following depending on the program flags value returned:
   0=Call the Send Operate Light command.
   1=Store all keypad digit entries and set the program flag to 2.
   2=Jump to the Program routine.
2. Active a Column 1,2,3 write and Monitor the Numeric Digit and the "R"/"L" buttons and if active perform one of the following depending on the button depressed:
   "R"/"L" jump to the Digit _plus routine.
   Numeric Digit=jump to the Digit routine.
3. Check the master clock and if the clock equals a pre-determined value jump to the Clock routine.
4. Check the Sleep timer and if the timer equals a pre-determined value jump to the Bedtime routine.
5. Return to section 1.

Figure 26:
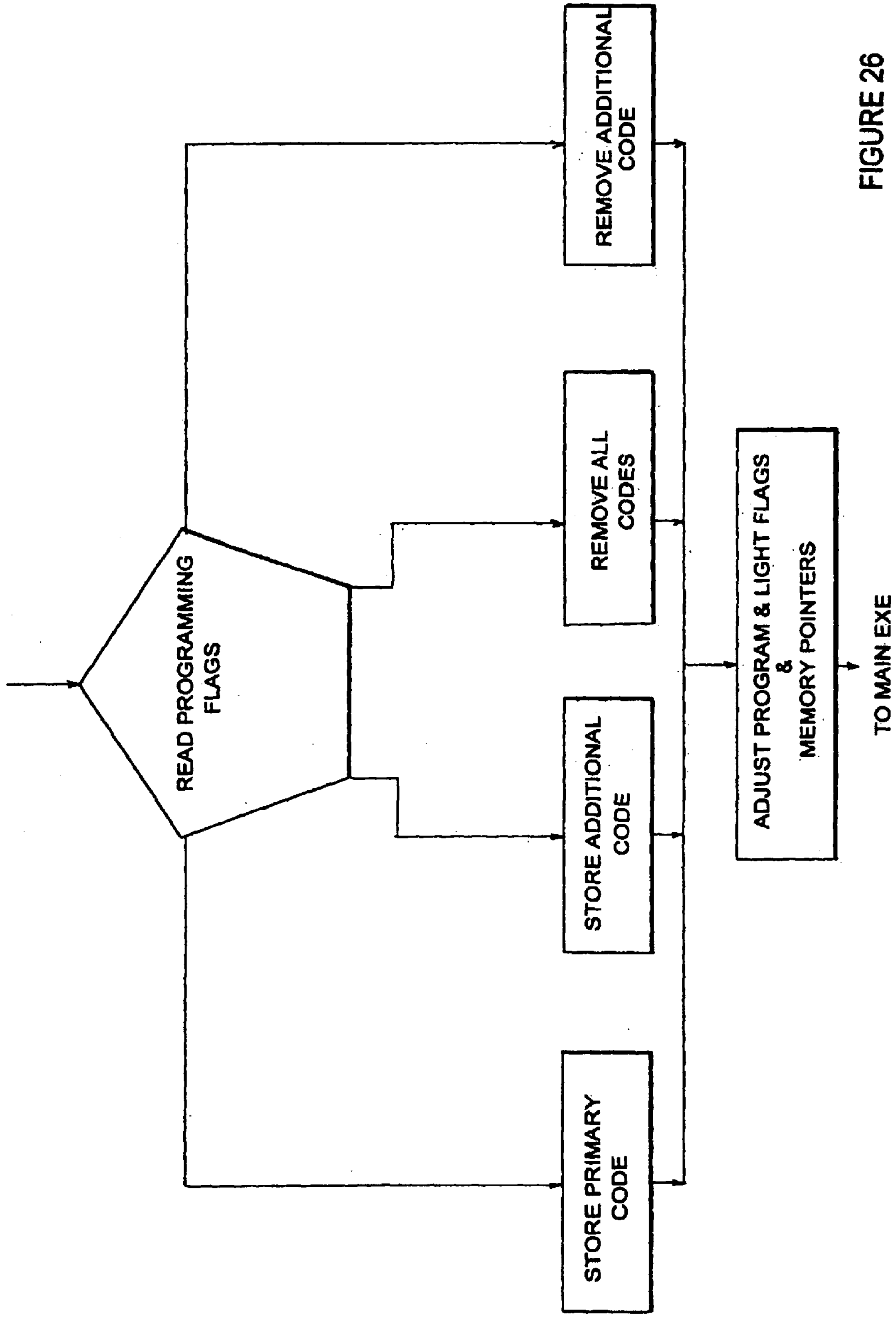
FIGS. 26 show the program function of the Remote Operational Control Unit Software Operation.

3.0 Program (FIG. 26)

The Program routine will perform one operation as described in the table below depending on the status of the following flags:

Init=0

Code=1 set the code flag=2 & set the indicator flag=off.

Code=2 compare the 2 sets of digit entries and
   If they match STORE the entry as a primary passcode. Clear all program flags and re-adjust the indicator flag.
   If they do not match clear entries and all flags.

Init=1

Code=1 call the Validation routine to validate the first digit entry and
   If valid set/clear the PS flag depending on weather the entry is a primary passcode.
   If not valid clear entries and all flags.

Code=2 check the PS flag and proceed as follows:
   PS=prim: call the Validation routine to validate the second digit entry
      and
      If valid primary passcode, REMOVE All stored passcode entries and clear all program flags and re-adjust the indicator flag.
      If not primary passcode, STORE ADDITION entry as a passcode.
      PS=sec/ov: call the Validation routine to validate the second digit entry
      and
         If valid passcode, REMOVE ADDITION entry from memory.
         If not valid passcode, clear entries and all flags.

4.0 Digit_plus and Digit

The Digit routine will check the digit counter and if not at max will store the entered digit and increment the digit counter.

The Digit_plus routine will perform as described below depending the button depressed.

If the button depressed was a non-digit, this routine will jump to the Digit routine.

If the button depressed was either "R" or "L" then a the digit entry will be check for Validation and
   If valid a SEND Operate Door 1 or 2 command will be called depending on which button was depressed.
   If not valid will clear all entries, counters and flags.

5.0 LightSw_ck

This routine will monitor the length of time the light button is depressed.

If the button is depressed for more then 5 seconds the program flag is set to 1.

Figure 27:
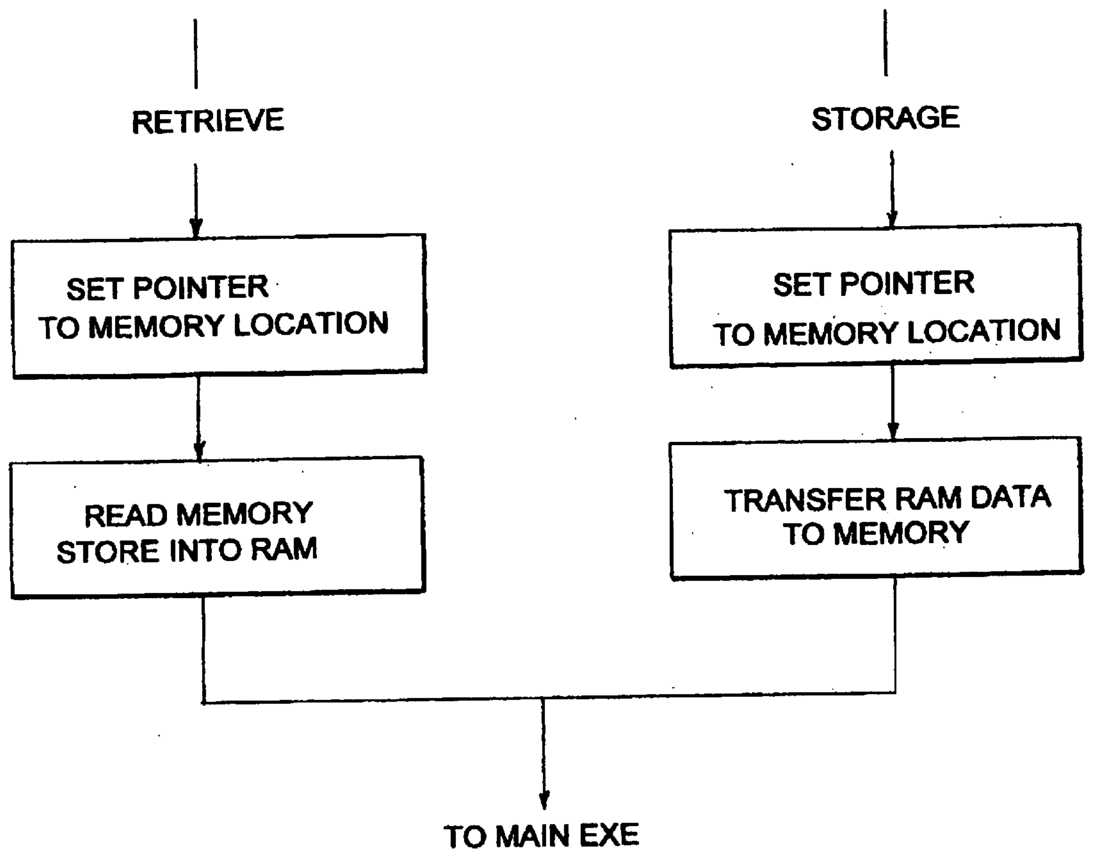
FIG. 27 shows the EE memory function of the Remote Operational Control Unit Software Operation.

6.0 EE Memory (FIG. 27)

Retrieve

This routine will perform as follows:

1. Set the data to read counter to 25
   8 digits times 3 words (passcodes), plus 1 data valid bit.
2. Adjust the memory pointers.
3. Read and transfer all the data to system ram.
4. Check the data valid bit and
   If valid, set the Init flag and retain the data in system ram.
   If not valid clear the Init flag.

Store

This routine will perform as follows:

1. Determine first open available memory location and set the memory pointer.

2. Set the data to write counter to 8 (8 digits passcodes).

3. Transfer all the data to permanent memory.

4. Write a valid data bit to permanent memory.

7.0 Bedtime (Sleep/Wake)

This routine will prepare the system for low power (Sleep) mode of operation by:

1. Turning off the indicator panel light.

2. Clearing all the program flags.

3. Clearing all the timers and counters.

4. Enabling the master reset output pin which allows a panel door circuit to Wake the system after receiving a trigger signal on the master clear input pin.

5. Execute a Sleep system command.

Figure 28:
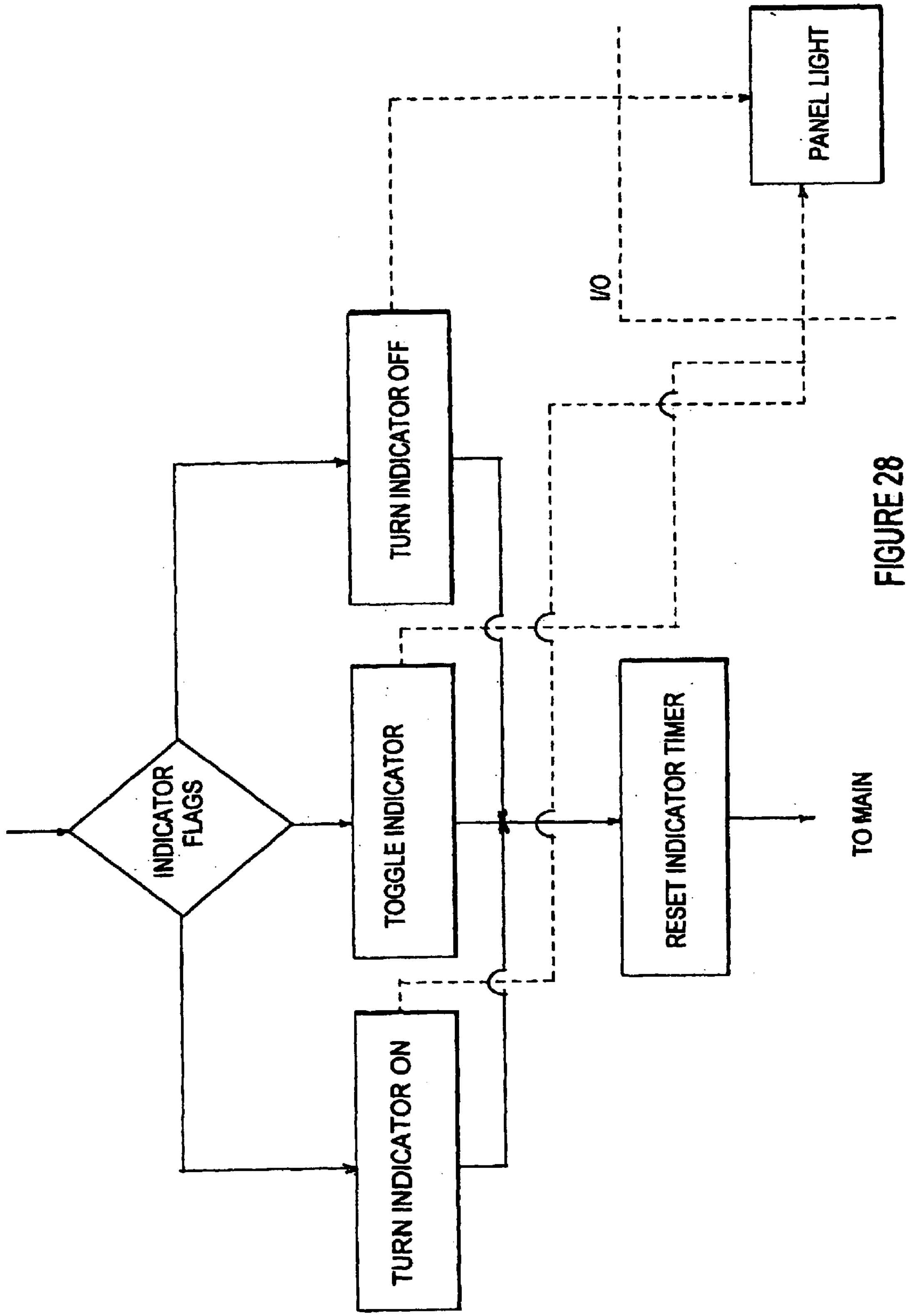
FIG. 28 shows the clock function of the Remote Operational Control Unit Software Operation.

8.0 Clock (FIG. 28)

This routine will proceed as follows:

1. Reset the master clock and

2. Depending on the status of the indicator flag:

1=toggle panel light from either on to off OR off to on.

2=turn panel light off

3=turn panel light on 9.0 Validation

This routine will proceed as follows:

1. Reset all memory pointers to zero.

2. Set the word checking counter to 3.

3. Compare each digit (8) entered to the passcode digits stored in ram memory.

If a match is found the corresponding word value is set as a return value

And the routine exits.

4. If no match is found the word counter is advanced and the procedure repeats.

If no match is found after the third word compare, the return flag value is set to zero.

And the routine exits.

Figure 29:
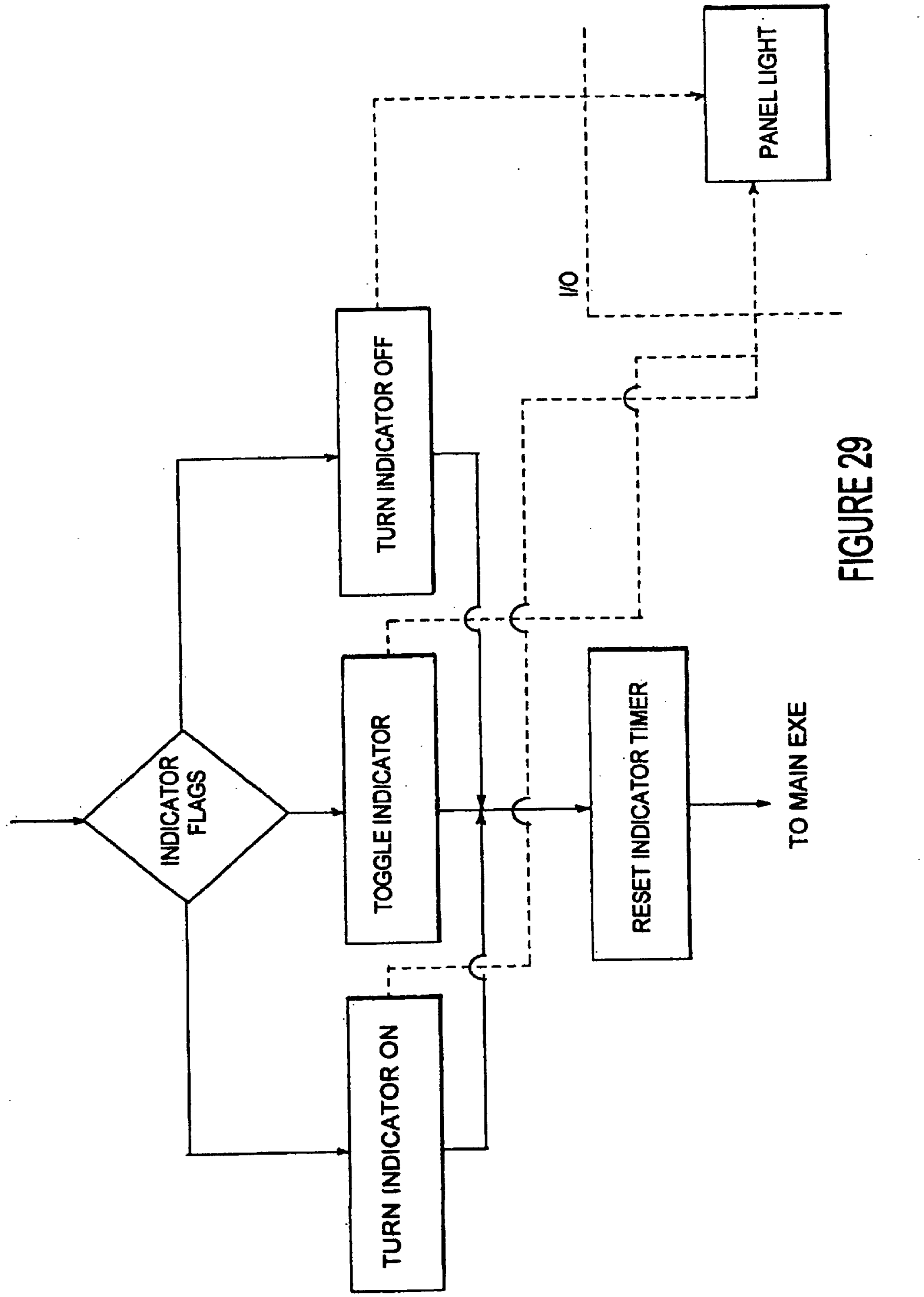
FIG. 29 shows the send routine function of the Remote Operational Control Unit Software Operation.

10.0 Send Routine (FIG. 29)

This routine will active the RF circuit as follows depending on which command is triggered by the calling routine. Refer to the following table.

RF Data Signal Reference Table

| RF Data Value | Level@ Signal# 2 1 0 | Send Command |
|---|---|---|
| 0 | 0 0 0 | no data transmission |
| 1 | 0 0 1 | operate door 1 |
| 2 | 0 1 0 | operate door 2 |
| 3 | 0 1 1 | operate light |
| 4 | 1 0 0 | not valid |
| 5 | 1 0 1 | operate door 1 w/ lock override |
| 6 | 1 1 0 | operate door 2 w/ lock override |
| 7 | 1 1 1 | not valid |

We claim:

1. An improved garage door opener comprising a motor drive unit and a wall console for opening and closing a garage door, said motor drive unit being connected to said wall console by means of one or more wires, said motor drive unit being adapted to be connected to a motor drive unit of a second garage door opener and said wall console being adapted to be connected to a wall console for operating said motor drive unit of said second garage opener, said wall console of said second garage door opener operating its motor drive unit through the connection of the first wall console to said first motor drive unit.

2. The motor drive unit according to claim 1 wherein each of said motor drive units have a microcontroller and each of said wall consoles have a microcontroller.

3. The garage door opener according to claim 2 wherein the microcontroller of said first wall console is connected to the microcontroller of its motor drive unit by a digital data bus.

4. The garage door opener according to claim 3 wherein said digital data bus is synchronous.

5. The garage door opener according to claim 3 wherein said digital data bus is asynchronous.

6. The garage door opener according to claim 5 wherein said microcontroller of said first wall console and the microcontroller of said first motor drive unit are connected by three wires, a return ground wire, a data wire and a clock wire.

7. An improved garage door opener comprising a motor drive unit for opening and closing a garage door, said motor drive unit having a microcontroller and a wall console, said wall console having a microcontroller, said microcontroller of said motor drive unit being connected to the microcontroller of the wall console by means of a digital data bus.

8. The garage door opener according to claim 7 wherein said digital data bus is synchronous.

9. The garage door opener according to claim 7 wherein said digital data bus is asynchronous.

10. The garage door opener according to claim 8 wherein said microcontroller of said wall console and the microcontroller of said motor drive unit are connected by three wires, a return ground wire, a data wire and a clock wire.

11. The garage door opener according to claim 7 wherein said microcontroller has a control logic that permits a garage door to open and close rapidly until a preselected distance from an end of the door's travel is reached.

12. The garage door opener according to claim 11 wherein the garage door operates downwardly at first rate of travel until a selected point is reached, at which point, the control logic signals the motor drive unit to slow the door to a second rate of travel.

13. The garage door opener according to claim 11 wherein the garage door operates upwardly at first rate of travel until a selected point is reached, at which point, the control logic signals the motor drive unit to slow the door to a second rate of travel.

14. The garage door opener according to claim 11 wherein at least one microcontroller of controls the rate of travel of said door and said microcontroller makes periodic calculations of the door's location during its travel.

15. The garage door opener according to claim 14 wherein said microcontroller compares the location of the door at a given time to during travel to a previous calculation in memory such that when the appropriate location is reached, the microcontroller signals the motor drive unit to slow down.

16. The garage door opener according to claim 7 wherein the motor drive unit is provided with an optical sensor mounted on a gear wheel that is caused to rotate by movement of a belt as the door is raised or lowered and wherein one of said microcontrollers counts the revolutions of the gear wheel as it is turned by the belt to know the location of the door on its path of travel.

17. The garage door opener according to claim 16 wherein the rotations of said gear wheel permits the microcontroller to learn when to stop or slow the door down.

18. The garage door opener according to claim 7 wherein said microcontroller controls an output pin that locks the motor.

19. The garage door opener according to claim 18 wherein the locking mechanism is disengaged by said microcontroller prior to each start of the motor and engaged after the motor ceases.

20. The garage door opener according to claim 19 wherein said microcontroller releases the lock and engages the motor drive unit about 200 milliseconds after the release of the lock.

21. The garage door opener according to claim 7 further comprising a keypad for operating the garage door opener outside of a garage and wherein said keypad is provided with a switch to turn on or off a light in the motor drive unit in the garage.

22. The garage door opener according to claim 7 wherein the garage door opener has a control logic measures door speed during travel of the garage door and adjusts the force of the door opening or closing based on said measurement.

23. The garage door opener according to claim 22 where the control logic measures the door speed approximately 16 times per second during travel of the door.

24. The garage door opener according to claim 23 wherein a tolerance window is created by said control logic during travel of said door, said tolerance window being periodically updated during travel of said door such that the motor drive unit will cease movement of the door if the control logic calculates a door speed outside the tolerance window.

25. The garage door opener according to claim 7 further comprising an keypad for operating the garage door opener outside of a garage and wherein said keypad is able to control two garage door motor drive units connected thereto.

* * * * *

Disclaimer

6,624,605 — Joel Powder, Nesconset, NY (US); John Piechowiak, Franklin Sq, NY (US); James H. St. Pierre, Commack, NY (US); Peter Wolfe, Totowa, NJ (US); Donald Pastor, Northport, NY (US); Erick L. Dobis, Woodhaven, NY (US). METHOD, SYSTEM AND APPARATUS FOR OPENING DOORS. Patent dated Sep. 23, 2003. Disclaimer filed Dec. 19, 2005, by the assignee, The Chamberlain Group, Inc.

Hereby enters this disclaimer to claims 7, 9, 10, 14, 21 and 22, of said patent.

*(Official Gazette, February 14, 2006)*